(12) United States Patent
Katz et al.

(10) Patent No.: US 9,161,087 B2
(45) Date of Patent: Oct. 13, 2015

(54) USER CONTROLLED MULTI-DEVICE MEDIA-ON-DEMAND SYSTEM

(75) Inventors: Neil Katz, Parkland, FL (US); Bruce P. Semple, Potomac, MD (US); Edith H. Stern, Yorktown Heights, NY (US); Barry E. Willner, Briarcliff Manor, NY (US)

(73) Assignee: Rovi Technologies Corporation, Santa Clara, CA (US)

( * ) Notice: Subject to any disclaimer, the term of this patent is extended or adjusted under 35 U.S.C. 154(b) by 0 days.

(21) Appl. No.: 13/280,013

(22) Filed: Oct. 24, 2011

(65) Prior Publication Data

US 2012/0047166 A1 Feb. 23, 2012

Related U.S. Application Data

(60) Continuation of application No. 11/458,930, filed on Jul. 20, 2006, which is a division of application No. 09/676,545, filed on Sep. 29, 2000, now Pat. No. 7,103,906.

(51) Int. Cl.
*H04N 21/472* (2011.01)
*H04N 7/173* (2011.01)
*H04N 21/2343* (2011.01)
(Continued)

(52) U.S. Cl.
CPC ..... *H04N 21/47217* (2013.01); *H04N 7/17318* (2013.01); *H04N 21/2343* (2013.01); *H04N 21/2402* (2013.01); *H04N 21/25808* (2013.01); *H04N 21/2662* (2013.01); *H04N 21/44209* (2013.01); *H04N 21/6582* (2013.01); *H04N 21/8455* (2013.01)

(58) Field of Classification Search
USPC ............................. 725/86–88, 91–92, 78, 80
See application file for complete search history.

(56) References Cited

U.S. PATENT DOCUMENTS

| 4,287,539 | A | 9/1981 | Bixby |
| 4,355,415 | A | 10/1982 | George et al. |

(Continued)

FOREIGN PATENT DOCUMENTS

| CA | 2635571 | 5/2009 |
| CN | 101707876 A | 5/2010 |

(Continued)

OTHER PUBLICATIONS

U.S. Appl. No. 09/332,244, filed Jun. 11, 1999, Ellis.
(Continued)

*Primary Examiner* — Jun Fei Zhong
(74) *Attorney, Agent, or Firm* — Ropes & Gray LLP

(57) ABSTRACT

A method for providing configurable access to media in a media-on-demand system also can include delivering the media to a first client device in a format compatible with the first client device; interrupting the delivery of the media; recording a bookmark specifying a position in the media where the interruption occurred; and resuming delivery of the media to a second client device, the resumed delivery beginning at a position in the media specified by the recorded bookmark. The method further can include identifying device properties for each of the first and second client devices; delivering the media to the first client device in a format compatible with the identified device properties for the first client device; and, delivering the media to the second client device in a format compatible with the identified device properties for the second client device.

10 Claims, 6 Drawing Sheets

(51) Int. Cl.
  *H04N 21/24* (2011.01)
  *H04N 21/258* (2011.01)
  *H04N 21/2662* (2011.01)
  *H04N 21/442* (2011.01)
  *H04N 21/658* (2011.01)
  *H04N 21/845* (2011.01)

(56) References Cited

U.S. PATENT DOCUMENTS

| | | | |
|---|---|---|---|
| 4,488,179 A | 12/1984 | Krüger et al. |
| 4,602,279 A | 7/1986 | Freeman |
| 4,605,964 A | 8/1986 | Chard |
| 4,694,490 A | 9/1987 | Harvey et al. |
| 4,704,725 A | 11/1987 | Harvey et al. |
| 4,706,121 A | 11/1987 | Young |
| 4,718,107 A | 1/1988 | Hayes |
| 4,745,549 A | 5/1988 | Hashimoto |
| 4,751,578 A | 6/1988 | Reiter et al. |
| 4,787,063 A | 11/1988 | Muguet |
| 4,847,698 A | 7/1989 | Freeman |
| 4,857,999 A | 8/1989 | Welsh |
| 4,908,707 A | 3/1990 | Kinghorn |
| 4,930,158 A | 5/1990 | Vogel |
| 4,959,720 A | 9/1990 | Duffield et al. |
| 4,963,994 A | 10/1990 | Levine |
| 4,965,825 A | 10/1990 | Harvey et al. |
| 4,977,455 A | 12/1990 | Young |
| 5,027,400 A | 6/1991 | Baji et al. |
| 5,047,867 A | 9/1991 | Strubbe et al. |
| 5,109,279 A | 4/1992 | Ando |
| 5,109,414 A | 4/1992 | Harvey et al. |
| 5,134,719 A | 7/1992 | Mankovitz |
| 5,151,789 A | 9/1992 | Young |
| 5,155,591 A | 10/1992 | Wachob |
| 5,172,413 A | 12/1992 | Bradley et al. |
| 5,200,822 A | 4/1993 | Bronfin et al. |
| 5,223,924 A | 6/1993 | Strubbe |
| 5,231,493 A | 7/1993 | Apitz |
| 5,233,654 A | 8/1993 | Harvey et al. |
| 5,249,043 A | 9/1993 | Grandmougin |
| 5,253,066 A | 10/1993 | Vogel |
| 5,291,554 A | 3/1994 | Morales |
| 5,299,006 A | 3/1994 | Kim |
| 5,317,730 A | 5/1994 | Moore et al. |
| 5,335,277 A | 8/1994 | Harvey et al. |
| 5,339,434 A | 8/1994 | Rusis |
| 5,341,350 A | 8/1994 | Frank et al. |
| 5,346,326 A | 9/1994 | Bienvenu |
| 5,353,121 A | 10/1994 | Young et al. |
| 5,355,162 A | 10/1994 | Yazolino et al. |
| 5,355,302 A | 10/1994 | Martin et al. |
| 5,357,276 A | 10/1994 | Banker et al. |
| 5,400,402 A | 3/1995 | Garfinkle |
| 5,404,567 A | 4/1995 | DePietro et al. |
| 5,410,343 A | 4/1995 | Coddington et al. |
| 5,410,344 A | 4/1995 | Graves et al. |
| 5,412,720 A | 5/1995 | Hoarty |
| 5,426,699 A | 6/1995 | Wunderlich et al. |
| 5,442,389 A | 8/1995 | Blahut et al. |
| 5,442,390 A | 8/1995 | Hooper et al. |
| 5,453,779 A | 9/1995 | Dan et al. |
| 5,461,415 A | 10/1995 | Wolf et al. |
| 5,465,385 A | 11/1995 | Ohga et al. |
| 5,477,263 A | 12/1995 | O'Callaghan et al. |
| 5,479,266 A | 12/1995 | Young et al. |
| 5,479,268 A | 12/1995 | Young et al. |
| 5,479,302 A | 12/1995 | Haines |
| 5,485,197 A | 1/1996 | Hoarty |
| 5,502,504 A | 3/1996 | Marshall et al. |
| 5,506,932 A | 4/1996 | Holmes et al. |
| 5,517,254 A | 5/1996 | Monta et al. |
| 5,517,257 A | 5/1996 | Dunn et al. |
| 5,521,631 A | 5/1996 | Budow et al. |
| 5,523,794 A | 6/1996 | Mankovitz et al. |
| 5,524,195 A | 6/1996 | Clanton, III et al. |
| 5,524,271 A | 6/1996 | Hollmann et al. |
| 5,528,513 A | 6/1996 | Vaitzblit et al. |
| 5,532,773 A | 7/1996 | Shaw et al. |
| 5,537,141 A | 7/1996 | Harper et al. |
| 5,539,449 A | 7/1996 | Blahut et al. |
| 5,539,880 A | 7/1996 | Lakhani |
| 5,541,638 A | 7/1996 | Story |
| 5,541,738 A | 7/1996 | Mankovitz |
| 5,548,338 A | 8/1996 | Ellis et al. |
| 5,550,576 A | 8/1996 | Klosterman |
| 5,550,825 A | 8/1996 | McMullan, Jr. et al. |
| 5,557,338 A | 9/1996 | Maze et al. |
| 5,557,724 A | 9/1996 | Sampat et al. |
| 5,558,339 A | 9/1996 | Perlman |
| 5,559,548 A | 9/1996 | Davis et al. |
| 5,559,549 A | 9/1996 | Hendricks et al. |
| 5,568,614 A | 10/1996 | Mendelson et al. |
| 5,574,778 A | 11/1996 | Ely et al. |
| 5,576,755 A | 11/1996 | Davis et al. |
| 5,583,561 A | 12/1996 | Baker et al. |
| 5,583,563 A | 12/1996 | Wanderscheid et al. |
| 5,585,838 A | 12/1996 | Lawler et al. |
| 5,585,858 A | 12/1996 | Harper et al. |
| 5,585,866 A | 12/1996 | Miller et al. |
| 5,586,264 A | 12/1996 | Belknap et al. |
| 5,589,892 A | 12/1996 | Knee et al. |
| 5,592,551 A | 1/1997 | Lett et al. |
| 5,594,509 A | 1/1997 | Florin et al. |
| 5,594,779 A | 1/1997 | Goodman |
| 5,600,364 A | 2/1997 | Hendricks et al. |
| 5,602,582 A | 2/1997 | Wanderscheid et al. |
| 5,606,642 A | 2/1997 | Stautner et al. |
| 5,610,653 A | 3/1997 | Abecassis |
| 5,616,876 A | 4/1997 | Cluts |
| 5,619,247 A | 4/1997 | Russo |
| 5,619,249 A | 4/1997 | Billock et al. |
| 5,619,274 A | 4/1997 | Roop et al. |
| 5,623,613 A | 4/1997 | Rowe et al. |
| 5,625,678 A | 4/1997 | Blomfield-Brown |
| 5,629,733 A | 5/1997 | Youman et al. |
| 5,629,867 A | 5/1997 | Goldman |
| 5,629,980 A | 5/1997 | Stefik et al. |
| 5,630,060 A | 5/1997 | Tang et al. |
| 5,630,067 A | 5/1997 | Kindell et al. |
| 5,630,119 A | 5/1997 | Aristides et al. |
| 5,632,007 A | 5/1997 | Freeman |
| 5,635,987 A | 6/1997 | Park et al. |
| 5,640,484 A | 6/1997 | Mankovitz |
| 5,648,824 A | 7/1997 | Dunn et al. |
| 5,652,613 A | 7/1997 | Lazarus et al. |
| 5,654,748 A | 8/1997 | Matthews, III |
| 5,654,886 A | 8/1997 | Zereski, Jr. et al. |
| 5,657,072 A | 8/1997 | Aristides et al. |
| 5,666,645 A | 9/1997 | Thomas et al. |
| 5,671,277 A | 9/1997 | Ikenoue et al. |
| 5,671,377 A | 9/1997 | Bleidt et al. |
| 5,675,743 A | 10/1997 | Mavity |
| 5,678,041 A | 10/1997 | Baker et al. |
| 5,682,195 A | 10/1997 | Hendricks et al. |
| 5,684,525 A | 11/1997 | Klosterman |
| 5,694,163 A | 12/1997 | Harrison |
| 5,696,765 A | 12/1997 | Safadi |
| 5,708,845 A | 1/1998 | Wistendahl et al. |
| 5,708,961 A | 1/1998 | Hylton et al. |
| 5,710,601 A | 1/1998 | Marshall et al. |
| 5,717,452 A | 2/1998 | Janin et al. |
| 5,721,815 A | 2/1998 | Ottesen et al. |
| 5,721,829 A | 2/1998 | Dunn et al. |
| 5,727,060 A | 3/1998 | Young |
| 5,732,216 A | 3/1998 | Logan et al. |
| 5,734,119 A | 3/1998 | France et al. |
| 5,742,443 A | 4/1998 | Tsao et al. |
| 5,745,710 A | 4/1998 | Clanton, III et al. |
| 5,751,282 A | 5/1998 | Girard et al. |
| 5,751,672 A | 5/1998 | Yankowski et al. |
| 5,751,883 A | 5/1998 | Ottesen |
| 5,752,159 A | 5/1998 | Faust et al. |
| 5,752,160 A | 5/1998 | Dunn |

(56) References Cited

U.S. PATENT DOCUMENTS

| | | |
|---|---|---|
| 5,754,771 A | 5/1998 | Epperson et al. |
| 5,758,257 A | 5/1998 | Herz et al. |
| 5,758,258 A | 5/1998 | Shoff et al. |
| 5,758,259 A | 5/1998 | Lawler |
| 5,760,821 A | 6/1998 | Ellis et al. |
| 5,761,417 A | 6/1998 | Henley et al. |
| 5,761,607 A | 6/1998 | Gudesen et al. |
| 5,768,528 A | 6/1998 | Stumm |
| 5,771,354 A | 6/1998 | Crawford et al. |
| 5,774,170 A | 6/1998 | Hite et al. |
| 5,778,181 A | 7/1998 | Hidary et al. |
| 5,778,182 A | 7/1998 | Cathey et al. |
| 5,778,187 A | 7/1998 | Monteiro et al. |
| 5,781,226 A | 7/1998 | Sheehan |
| 5,781,227 A | 7/1998 | Goode et al. |
| 5,781,228 A | 7/1998 | Sposato |
| 5,790,198 A | 8/1998 | Roop et al. |
| 5,790,423 A | 8/1998 | Lau et al. |
| 5,793,366 A | 8/1998 | Mano et al. |
| 5,793,412 A | 8/1998 | Asamizuya |
| 5,793,971 A | 8/1998 | Fujita et al. |
| 5,794,217 A | 8/1998 | Allen |
| 5,796,952 A | 8/1998 | Davis et al. |
| 5,798,921 A | 8/1998 | Johnson et al. |
| 5,802,284 A | 9/1998 | Karlton et al. |
| 5,805,154 A | 9/1998 | Brown |
| 5,805,763 A | 9/1998 | Lawler et al. |
| 5,805,804 A | 9/1998 | Laursen et al. |
| 5,805,806 A | 9/1998 | McArthur |
| 5,808,608 A | 9/1998 | Young et al. |
| 5,808,694 A | 9/1998 | Usui et al. |
| 5,809,246 A | 9/1998 | Goldman |
| 5,812,123 A | 9/1998 | Rowe et al. |
| 5,812,205 A | 9/1998 | Milnes et al. |
| 5,812,763 A | 9/1998 | Teng |
| 5,815,146 A | 9/1998 | Youden et al. |
| 5,815,297 A | 9/1998 | Ciciora |
| 5,818,438 A | 10/1998 | Howe et al. |
| 5,818,439 A | 10/1998 | Nagasaka et al. |
| 5,819,019 A | 10/1998 | Nelson |
| 5,819,160 A | 10/1998 | Foladare et al. |
| 5,822,530 A | 10/1998 | Brown |
| 5,828,945 A | 10/1998 | Klosterman |
| RE35,954 E | 11/1998 | Levine |
| 5,832,287 A | 11/1998 | Atalla |
| 5,835,126 A | 11/1998 | Lewis |
| 5,841,979 A | 11/1998 | Schulhof et al. |
| 5,844,620 A | 12/1998 | Coleman et al. |
| 5,850,218 A | 12/1998 | LaJoie et al. |
| 5,861,906 A | 1/1999 | Dunn et al. |
| 5,872,588 A | 2/1999 | Aras et al. |
| 5,881,245 A | 3/1999 | Thompson |
| 5,883,621 A | 3/1999 | Iwamura |
| 5,884,028 A | 3/1999 | Kindell et al. |
| 5,884,141 A | 3/1999 | Inoue et al. |
| 5,886,707 A | 3/1999 | Berg |
| 5,886,732 A | 3/1999 | Humpleman |
| 5,887,243 A | 3/1999 | Harvey et al. |
| 5,892,915 A | 4/1999 | Duso et al. |
| 5,894,589 A | 4/1999 | Reber et al. |
| 5,896,414 A | 4/1999 | Meyer et al. |
| 5,898,441 A | 4/1999 | Flurry |
| 5,898,456 A | 4/1999 | Wahl |
| 5,899,582 A | 5/1999 | DuLac |
| 5,900,904 A | 5/1999 | Okada et al. |
| 5,903,234 A | 5/1999 | Kimura |
| 5,903,263 A | 5/1999 | Emura |
| 5,903,264 A | 5/1999 | Moeller et al. |
| 5,903,723 A | 5/1999 | Beck et al. |
| 5,905,522 A | 5/1999 | Lawler |
| 5,905,847 A | 5/1999 | Kobayashi et al. |
| 5,909,638 A | 6/1999 | Allen |
| 5,911,046 A | 6/1999 | Amano |
| 5,913,039 A | 6/1999 | Nakamura et al. |
| 5,914,941 A | 6/1999 | Janky |
| 5,915,090 A | 6/1999 | Joseph et al. |
| 5,915,094 A | 6/1999 | Kouloheris et al. |
| 5,916,303 A | 6/1999 | Scott |
| 5,917,538 A | 6/1999 | Asamizuya |
| 5,917,835 A | 6/1999 | Barrett et al. |
| 5,920,702 A | 7/1999 | Bleidt et al. |
| 5,920,800 A | 7/1999 | Schafer |
| 5,922,045 A | 7/1999 | Hanson |
| 5,922,048 A | 7/1999 | Emura |
| 5,923,361 A | 7/1999 | Sutton, Jr. |
| 5,926,204 A | 7/1999 | Mayer |
| 5,926,205 A | 7/1999 | Krause et al. |
| 5,926,624 A | 7/1999 | Katz et al. |
| 5,928,327 A | 7/1999 | Wang et al. |
| 5,929,849 A | 7/1999 | Kikinis |
| 5,929,850 A | 7/1999 | Broadwin et al. |
| 5,930,473 A | 7/1999 | Teng et al. |
| 5,930,493 A | 7/1999 | Ottesen et al. |
| 5,931,901 A | 8/1999 | Wolfe et al. |
| 5,933,603 A | 8/1999 | Vahalia et al. |
| 5,933,835 A | 8/1999 | Adams et al. |
| 5,935,206 A | 8/1999 | Dixon et al. |
| 5,936,569 A | 8/1999 | Ståhle et al. |
| 5,936,673 A | 8/1999 | Agarwal |
| 5,940,071 A | 8/1999 | Treffers et al. |
| 5,940,073 A | 8/1999 | Klosterman et al. |
| 5,943,046 A | 8/1999 | Cave et al. |
| 5,943,047 A | 8/1999 | Suzuki |
| 5,945,987 A | 8/1999 | Dunn |
| 5,945,988 A | 8/1999 | Williams et al. |
| 5,947,746 A | 9/1999 | Tsai |
| 5,949,411 A | 9/1999 | Doerr et al. |
| 5,956,482 A | 9/1999 | Agraharam et al. |
| 5,956,716 A | 9/1999 | Kenner et al. |
| 5,959,659 A | 9/1999 | Dokic |
| 5,961,603 A | 10/1999 | Kunkel et al. |
| 5,963,202 A | 10/1999 | Polish |
| 5,964,455 A | 10/1999 | Catanzarite et al. |
| 5,969,283 A | 10/1999 | Looney et al. |
| 5,969,714 A | 10/1999 | Butcher |
| 5,973,680 A | 10/1999 | Ueda |
| 5,973,722 A | 10/1999 | Wakai et al. |
| 5,974,217 A | 10/1999 | Haraguchi |
| 5,977,963 A | 11/1999 | Gaughan et al. |
| 5,977,964 A | 11/1999 | Williams et al. |
| 5,978,567 A | 11/1999 | Rebane et al. |
| 5,978,843 A | 11/1999 | Wu et al. |
| 5,986,650 A | 11/1999 | Ellis et al. |
| 5,990,881 A * | 11/1999 | Inoue et al. .................. 715/720 |
| 5,999,688 A | 12/1999 | Iggulden et al. |
| 5,999,970 A | 12/1999 | Krisbergh et al. |
| 6,002,394 A | 12/1999 | Schein et al. |
| 6,002,720 A | 12/1999 | Yurt et al. |
| 6,005,564 A | 12/1999 | Ahmad et al. |
| 6,005,600 A | 12/1999 | Hill |
| 6,008,802 A | 12/1999 | Iki et al. |
| 6,009,465 A | 12/1999 | Decker et al. |
| 6,012,089 A | 1/2000 | Hasegawa |
| 6,012,091 A | 1/2000 | Boyce |
| 6,014,184 A | 1/2000 | Knee et al. |
| 6,014,381 A | 1/2000 | Troxel et al. |
| 6,014,689 A | 1/2000 | Budge et al. |
| 6,014,693 A | 1/2000 | Ito et al. |
| 6,014,694 A | 1/2000 | Aharoni et al. |
| 6,014,706 A | 1/2000 | Cannon et al. |
| 6,018,359 A | 1/2000 | Kermode et al. |
| 6,018,612 A | 1/2000 | Thomason et al. |
| 6,018,765 A | 1/2000 | Durana et al. |
| 6,020,912 A | 2/2000 | De Lang |
| 6,020,930 A | 2/2000 | Legrand |
| 6,022,223 A | 2/2000 | Taniguchi et al. |
| 6,023,725 A | 2/2000 | Ozawa et al. |
| 6,025,837 A | 2/2000 | Matthews, III et al. |
| 6,025,868 A | 2/2000 | Russo |
| 6,028,600 A | 2/2000 | Rosin et al. |
| 6,029,045 A | 2/2000 | Picco et al. |
| 6,029,064 A | 2/2000 | Farris et al. |
| 6,032,202 A | 2/2000 | Lea et al. |
| 6,038,591 A | 3/2000 | Wolfe et al. |

(56) References Cited

U.S. PATENT DOCUMENTS

| | | | |
|---|---|---|---|
| 6,038,614 A | 3/2000 | Chan et al. |
| 6,049,823 A | 4/2000 | Hwang |
| 6,049,831 A | 4/2000 | Gardell et al. |
| 6,052,145 A | 4/2000 | Macrae et al. |
| 6,061,056 A | 5/2000 | Menard et al. |
| 6,064,380 A | 5/2000 | Swenson et al. |
| 6,085,236 A | 7/2000 | Lea |
| 6,091,823 A | 7/2000 | Hosomi et al. |
| 6,091,883 A | 7/2000 | Artigalas et al. |
| 6,098,082 A | 8/2000 | Gibbon et al. |
| 6,111,677 A | 8/2000 | Shintani et al. |
| 6,112,181 A | 8/2000 | Shear et al. |
| 6,118,450 A | 9/2000 | Proehl et al. |
| 6,119,144 A | 9/2000 | Fujita et al. |
| 6,125,230 A | 9/2000 | Yaginuma et al. |
| 6,141,003 A | 10/2000 | Chor |
| 6,141,488 A | 10/2000 | Knudson et al. |
| 6,147,715 A | 11/2000 | Yuen et al. |
| 6,154,203 A | 11/2000 | Yuen et al. |
| 6,154,206 A | 11/2000 | Ludtke |
| 6,160,546 A | 12/2000 | Thompson et al. |
| 6,160,796 A | 12/2000 | Zou |
| 6,163,316 A | 12/2000 | Killian |
| 6,166,730 A * | 12/2000 | Goode et al. ............ 715/716 |
| 6,167,188 A | 12/2000 | Young et al. |
| 6,169,725 B1 | 1/2001 | Gibbs et al. |
| 6,170,006 B1 | 1/2001 | Namba |
| 6,172,712 B1 | 1/2001 | Beard |
| 6,177,931 B1 | 1/2001 | Alexander et al. |
| 6,181,867 B1 | 1/2001 | Kenner et al. |
| 6,182,094 B1 | 1/2001 | Humpleman et al. |
| 6,184,878 B1 | 2/2001 | Alonso et al. |
| 6,185,621 B1 | 2/2001 | Romine |
| 6,208,335 B1 | 3/2001 | Gordon et al. |
| 6,208,341 B1 | 3/2001 | van Ee et al. |
| 6,219,839 B1 | 4/2001 | Sampsell |
| 6,230,200 B1 | 5/2001 | Forecast et al. |
| 6,230,325 B1 | 5/2001 | Iinuma et al. |
| 6,232,539 B1 | 5/2001 | Looney et al. |
| 6,236,395 B1 | 5/2001 | Sezan et al. |
| 6,237,049 B1 | 5/2001 | Ludtke |
| 6,243,707 B1 | 6/2001 | Humpleman et al. |
| 6,243,725 B1 | 6/2001 | Hempleman et al. |
| 6,243,865 B1 | 6/2001 | Wei et al. |
| 6,263,503 B1 | 7/2001 | Margulis |
| 6,285,685 B1 | 9/2001 | Bum |
| 6,289,165 B1 | 9/2001 | Abecassis |
| 6,289,346 B1 | 9/2001 | Milewski et al. |
| 6,311,011 B1 | 10/2001 | Kuroda |
| 6,314,575 B1 | 11/2001 | Billock et al. |
| 6,324,338 B1 | 11/2001 | Wood et al. |
| 6,349,410 B1 | 2/2002 | Lortz |
| 6,353,700 B1 | 3/2002 | Zhou |
| 6,356,971 B1 | 3/2002 | Katz et al. |
| 6,359,661 B1 | 3/2002 | Nickum |
| 6,388,714 B1 | 5/2002 | Schein et al. |
| 6,393,430 B1 | 5/2002 | Van Ryzin |
| 6,401,242 B1 | 6/2002 | Eyer et al. |
| 6,433,835 B1 | 8/2002 | Hartson et al. |
| 6,441,832 B1 | 8/2002 | Tao et al. |
| 6,449,767 B1 | 9/2002 | Krapf et al. |
| 6,456,621 B1 | 9/2002 | Wada et al. |
| RE37,881 E | 10/2002 | Haines |
| 6,466,080 B2 | 10/2002 | Kawai et al. |
| 6,473,559 B1 | 10/2002 | Knudson et al. |
| 6,480,667 B1 | 11/2002 | O'Connor |
| 6,483,986 B1 | 11/2002 | Krapf |
| 6,487,145 B1 | 11/2002 | Berhan |
| 6,487,362 B1 | 11/2002 | Yuen et al. |
| 6,496,981 B1 | 12/2002 | Wistendahl et al. |
| 6,498,895 B2 | 12/2002 | Young et al. |
| 6,505,348 B1 | 1/2003 | Knowles et al. |
| 6,526,575 B1 | 2/2003 | McCoy et al. |
| 6,539,548 B1 | 3/2003 | Hendricks et al. |
| 6,543,053 B1 | 4/2003 | Li et al. |
| 6,564,378 B1 | 5/2003 | Satterfield et al. |
| 6,577,735 B1 | 6/2003 | Bharat |
| 6,578,070 B1 | 6/2003 | Weaver et al. |
| 6,594,699 B1 | 7/2003 | Sahai et al. |
| 6,630,954 B1 | 10/2003 | Okada |
| 6,647,417 B1 | 11/2003 | Hunter et al. |
| 6,654,933 B1 | 11/2003 | Abbott et al. |
| 6,657,116 B1 | 12/2003 | Gunnerson |
| 6,671,882 B1 | 12/2003 | Murphy et al. |
| 6,678,737 B1 | 1/2004 | Bucher |
| 6,711,622 B1 | 3/2004 | Fuller et al. |
| 6,741,617 B2 | 5/2004 | Rosengren et al. |
| 6,745,391 B1 | 6/2004 | Macrae et al. |
| 6,746,127 B2 | 6/2004 | Suyama |
| 6,751,402 B1 | 6/2004 | Elliott et al. |
| 6,751,802 B1 | 6/2004 | Huizer et al. |
| 6,756,997 B1 | 6/2004 | Ward, III et al. |
| 6,760,758 B1 | 7/2004 | Lund et al. |
| 6,769,127 B1 | 7/2004 | Bonomi et al. |
| 6,788,882 B1 | 9/2004 | Geer et al. |
| 6,813,775 B1 | 11/2004 | Finseth et al. |
| 6,816,175 B1 | 11/2004 | Hamp et al. |
| 6,816,904 B1 | 11/2004 | Ludwig et al. |
| 6,820,278 B1 | 11/2004 | Ellis |
| 6,826,512 B2 | 11/2004 | Dara-Abrams et al. |
| 6,837,789 B2 | 1/2005 | Garahi et al. |
| 6,839,769 B2 | 1/2005 | Needham et al. |
| 6,868,225 B1 | 3/2005 | Brown et al. |
| 6,882,793 B1 | 4/2005 | Fu et al. |
| 6,901,603 B2 | 5/2005 | Zeidler et al. |
| 6,925,246 B1 | 8/2005 | Behl |
| 6,931,593 B1 | 8/2005 | Grooters |
| 6,938,101 B2 | 8/2005 | Hayes et al. |
| 6,950,624 B2 | 9/2005 | Kim et al. |
| 6,973,474 B2 | 12/2005 | Hatayama |
| 6,993,788 B1 | 1/2006 | Lawrence et al. |
| 7,035,804 B2 | 4/2006 | Saindon et al. |
| 7,039,643 B2 | 5/2006 | Sena et al. |
| 7,047,377 B2 | 5/2006 | Elder et al. |
| 7,058,635 B1 | 6/2006 | Shah-Nazaroff et al. |
| 7,086,077 B2 | 8/2006 | Giammaressi |
| 7,098,958 B2 | 8/2006 | Wredenhagen et al. |
| 7,103,906 B1 | 9/2006 | Katz et al. |
| 7,117,519 B1 | 10/2006 | Anderson et al. |
| 7,120,925 B2 | 10/2006 | D'Souza et al. |
| 7,127,735 B1 | 10/2006 | Lee |
| 7,143,432 B1 | 11/2006 | Brooks et al. |
| 7,159,232 B1 | 1/2007 | Blackketter et al. |
| 7,159,235 B2 | 1/2007 | Son et al. |
| 7,168,086 B1 | 1/2007 | Carpenter et al. |
| 7,171,677 B1 | 1/2007 | Ochiai |
| 7,178,161 B1 | 2/2007 | Fristoe et al. |
| 7,213,071 B2 | 5/2007 | DeLima et |
| 7,225,336 B2 | 5/2007 | Zunke |
| 7,231,175 B2 | 6/2007 | Ellis |
| 7,237,253 B1 | 6/2007 | Blackketter et al. |
| 7,240,356 B2 | 7/2007 | Iki et al. |
| 7,242,324 B2 | 7/2007 | Lai et al. |
| 7,248,778 B1 | 7/2007 | Anderson et al. |
| 7,260,461 B2 | 8/2007 | Rao et al. |
| 7,263,709 B1 | 8/2007 | Krapf |
| 7,269,733 B1 | 9/2007 | O'Toole, Jr. |
| 7,272,298 B1 | 9/2007 | Lang et al. |
| 7,292,774 B1 | 11/2007 | Masters et al. |
| 7,302,697 B1 | 11/2007 | Wilson et al. |
| 7,305,254 B2 | 12/2007 | Findikli |
| 7,346,920 B2 | 3/2008 | Lamkin et al. |
| 7,356,246 B1 | 4/2008 | Kobb |
| 7,356,829 B1 | 4/2008 | Terakado et al. |
| 7,366,199 B1 | 4/2008 | Vaughan et al. |
| 7,480,721 B2 | 1/2009 | Shaheen |
| 7,483,964 B1 | 1/2009 | Jackson et al. |
| 7,533,400 B1 | 5/2009 | Hailey et al. |
| 7,536,704 B2 | 5/2009 | Pierre et al. |
| 7,574,723 B2 | 8/2009 | Putterman et al. |
| 7,624,337 B2 | 11/2009 | Sull et al. |
| 7,624,345 B2 | 11/2009 | Nishina et al. |
| 7,650,621 B2 | 1/2010 | Thomas et al. |
| 7,684,673 B2 | 3/2010 | Monroe |

(56) References Cited

U.S. PATENT DOCUMENTS

| | | |
|---|---|---|
| 7,689,510 B2 | 3/2010 | Lamkin et al. |
| 7,761,892 B2 | 7/2010 | Ellis et al. |
| 7,787,010 B2 | 8/2010 | DiFrancesco |
| 7,793,326 B2 | 9/2010 | McCoskey et al. |
| 7,840,977 B2 | 11/2010 | Walker |
| 7,877,766 B1 | 1/2011 | Wu et al. |
| 7,917,933 B2 | 3/2011 | Thomas et al. |
| 7,929,551 B2 | 4/2011 | Dietrich |
| 8,082,568 B2 | 12/2011 | Ellis et al. |
| 8,086,575 B2 | 12/2011 | Putterman et al. |
| 8,295,674 B2 | 10/2012 | Sasaki et al. |
| 8,528,032 B2 | 9/2013 | Ellis et al. |
| 8,607,287 B2 | 12/2013 | Walker |
| 8,719,090 B2 | 5/2014 | Lewis |
| 8,732,757 B2 | 5/2014 | Ward et al. |
| 2001/0004338 A1 | 6/2001 | Yankowski |
| 2001/0007147 A1 | 7/2001 | Goldschmidt Iki et al. |
| 2001/0026287 A1 | 10/2001 | Watanabe |
| 2001/0033343 A1 | 10/2001 | Yap et al. |
| 2001/0039660 A1 | 11/2001 | Vasilevsky et al. |
| 2001/0042107 A1 | 11/2001 | Palm |
| 2001/0043700 A1 | 11/2001 | Shima et al. |
| 2002/0010652 A1 | 1/2002 | Deguchi |
| 2002/0026639 A1 | 2/2002 | Haneda |
| 2002/0042914 A1 | 4/2002 | Walker et al. |
| 2002/0043700 A1 | 4/2002 | Sasaki et al. |
| 2002/0046315 A1 | 4/2002 | Miller et al. |
| 2002/0056087 A1 | 5/2002 | Berezowski et al. |
| 2002/0059588 A1 | 5/2002 | Huber et al. |
| 2002/0059621 A1 | 5/2002 | Thomas et al. |
| 2002/0059642 A1 | 5/2002 | Russ et al. |
| 2002/0069218 A1 | 6/2002 | Sull et al. |
| 2002/0069746 A1 | 6/2002 | Taira et al. |
| 2002/0070982 A1 | 6/2002 | Hill et al. |
| 2002/0078293 A1 | 6/2002 | Kou et al. |
| 2002/0082901 A1 | 6/2002 | Dunning et al. |
| 2002/0087588 A1 | 7/2002 | McBride et al. |
| 2002/0088011 A1 | 7/2002 | Lamkin et al. |
| 2002/0104091 A1 | 8/2002 | Prabhu et al. |
| 2002/0113824 A1 | 8/2002 | Myers, Jr. |
| 2002/0116533 A1 | 8/2002 | Holliman et al. |
| 2002/0120935 A1 | 8/2002 | Huber et al. |
| 2002/0124254 A1 | 9/2002 | Kikinis |
| 2002/0161579 A1 | 10/2002 | Saindon et al. |
| 2002/0166123 A1 | 11/2002 | Schrader et al. |
| 2002/0174430 A1 | 11/2002 | Ellis et al. |
| 2002/0174444 A1 | 11/2002 | Gatto et al. |
| 2002/0180803 A1 | 12/2002 | Kaplan et al. |
| 2002/0188735 A1 | 12/2002 | Needham et al. |
| 2002/0194011 A1 | 12/2002 | Boies et al. |
| 2003/0005446 A1 | 1/2003 | Jaff et al. |
| 2003/0005454 A1 | 1/2003 | Rodriguez et al. |
| 2003/0035404 A1 | 2/2003 | Ozluturk et al. |
| 2003/0037068 A1 | 2/2003 | Thomas et al. |
| 2003/0046437 A1 | 3/2003 | Eytchison et al. |
| 2003/0066084 A1 | 4/2003 | Kaars |
| 2003/0066092 A1 | 4/2003 | Wagner |
| 2003/0068154 A1 | 4/2003 | Zylka |
| 2003/0101104 A1 | 5/2003 | Dimitrova et al. |
| 2003/0105813 A1 | 6/2003 | Mizutani |
| 2003/0110499 A1 | 6/2003 | Knudson et al. |
| 2003/0135860 A1 | 7/2003 | Dureau |
| 2003/0149980 A1 | 8/2003 | Ellis |
| 2003/0149988 A1 | 8/2003 | Ellis et al. |
| 2003/0152096 A1 | 8/2003 | Chapman |
| 2003/0162096 A1 | 8/2003 | Michot et al. |
| 2003/0163832 A1 | 8/2003 | Tsuria et al. |
| 2003/0187984 A1 | 10/2003 | Banavar et al. |
| 2003/0194260 A1 | 10/2003 | Ward et al. |
| 2003/0206710 A1 | 11/2003 | Ferman et al. |
| 2003/0214955 A1 | 11/2003 | Kim |
| 2004/0008972 A1 | 1/2004 | Haken |
| 2004/0088731 A1 | 5/2004 | Putterman et al. |
| 2004/0117831 A1 | 6/2004 | Ellis et al. |
| 2004/0128686 A1 | 7/2004 | Boyer et al. |
| 2004/0139233 A1 | 7/2004 | Kellerman et al. |
| 2004/0156614 A1 | 8/2004 | Bumgardner et al. |
| 2004/0181814 A1 | 9/2004 | Ellis et al. |
| 2004/0184763 A1 | 9/2004 | DiFrancesco |
| 2004/0193648 A1 | 9/2004 | Lai et al. |
| 2004/0220091 A1 | 11/2004 | Adam et al. |
| 2004/0226034 A1 | 11/2004 | Kaczowka et al. |
| 2004/0237104 A1 | 11/2004 | Cooper et al. |
| 2004/0255326 A1 | 12/2004 | Hicks, III et al. |
| 2004/0259537 A1 | 12/2004 | Ackley |
| 2004/0261040 A1 | 12/2004 | Radcliffe et al. |
| 2004/0267965 A1 | 12/2004 | Vasudevan et al. |
| 2005/0014531 A1 | 1/2005 | Findikli |
| 2005/0028208 A1 | 2/2005 | Ellis |
| 2005/0039208 A1 | 2/2005 | Veeck et al. |
| 2005/0046174 A1 | 3/2005 | Botes |
| 2005/0071876 A1 | 3/2005 | van Beek |
| 2005/0080497 A1 | 4/2005 | Rao |
| 2005/0102324 A1 | 5/2005 | Spring et al. |
| 2005/0120373 A1 | 6/2005 | Thomas et al. |
| 2005/0132264 A1 | 6/2005 | Joshi et al. |
| 2005/0138137 A1 | 6/2005 | Encarnacion et al. |
| 2005/0138658 A1 | 6/2005 | Bryan |
| 2005/0204388 A1 | 9/2005 | Knudson et al. |
| 2005/0204393 A1 | 9/2005 | Bopardikar et al. |
| 2005/0227611 A1 | 10/2005 | Ellis |
| 2005/0246393 A1 | 11/2005 | Coates et al. |
| 2005/0251827 A1 | 11/2005 | Ellis et al. |
| 2005/0254524 A1 | 11/2005 | An |
| 2005/0265395 A1 | 12/2005 | Kim et al. |
| 2006/0004685 A1 | 1/2006 | Pyhalammi et al. |
| 2006/0015888 A1 | 1/2006 | Shih |
| 2006/0031883 A1 | 2/2006 | Ellis et al. |
| 2006/0037054 A1 | 2/2006 | McDowell et al. |
| 2006/0041893 A1 | 2/2006 | Castro et al. |
| 2006/0064728 A1 | 3/2006 | Son et al. |
| 2006/0080707 A1 | 4/2006 | Laksono |
| 2006/0085835 A1 | 4/2006 | Istvan et al. |
| 2006/0090186 A1 | 4/2006 | Santangelo et al. |
| 2006/0095942 A1 | 5/2006 | van Beek |
| 2006/0173838 A1 | 8/2006 | Garg et al. |
| 2006/0215650 A1 | 9/2006 | Wollmershauser et al. |
| 2006/0238648 A1 | 10/2006 | Wogsberg |
| 2006/0248570 A1 | 11/2006 | Witwer |
| 2006/0253874 A1 | 11/2006 | Stark et al. |
| 2006/0259949 A1 | 11/2006 | Schaefer et al. |
| 2006/0271953 A1 | 11/2006 | Jacoby et al. |
| 2007/0011709 A1 | 1/2007 | Katz et al. |
| 2007/0022442 A1 | 1/2007 | Gil et al. |
| 2007/0028267 A1 | 2/2007 | Ostojic et al. |
| 2007/0032225 A1 | 2/2007 | Konicek et al. |
| 2007/0055980 A1 | 3/2007 | Megeid et al. |
| 2007/0089160 A1 | 4/2007 | Ando |
| 2007/0094702 A1 | 4/2007 | Khare et al. |
| 2007/0113246 A1 | 5/2007 | Xiong |
| 2007/0124781 A1 | 5/2007 | Casey et al. |
| 2007/0147351 A1 | 6/2007 | Dietrich et al. |
| 2007/0157234 A1 | 7/2007 | Walker |
| 2007/0157240 A1 | 7/2007 | Walker |
| 2007/0157241 A1 | 7/2007 | Walker |
| 2007/0157242 A1 | 7/2007 | Cordray et al. |
| 2007/0157260 A1 | 7/2007 | Walker |
| 2007/0157266 A1 | 7/2007 | Ellis et al. |
| 2007/0157281 A1 | 7/2007 | Ellis et al. |
| 2007/0162661 A1 | 7/2007 | Fu et al. |
| 2007/0169149 A1 | 7/2007 | Jennings et al. |
| 2007/0174774 A1 | 7/2007 | Lerman et al. |
| 2007/0198659 A1 | 8/2007 | Lam |
| 2007/0220024 A1 | 9/2007 | Putterman et al. |
| 2007/0220580 A1 | 9/2007 | Putterman |
| 2007/0282969 A1 | 12/2007 | Dietrich et al. |
| 2007/0283046 A1 | 12/2007 | Dietrich et al. |
| 2008/0034396 A1 | 2/2008 | Lev |
| 2008/0060001 A1 | 3/2008 | Logan et al. |
| 2008/0141303 A1 | 6/2008 | Walker et al. |
| 2008/0189440 A1 | 8/2008 | Goyal et al. |
| 2008/0263227 A1 | 10/2008 | Roberts et al. |
| 2008/0307477 A1 | 12/2008 | Omernick |
| 2009/0019492 A1 | 1/2009 | Grasset |

(56) References Cited

U.S. PATENT DOCUMENTS

| | | |
|---|---|---|
| 2009/0138922 A1 | 5/2009 | Thomas et al. |
| 2010/0186034 A1 | 7/2010 | Walker |
| 2011/0106901 A1 | 5/2011 | Wu |
| 2011/0131607 A1 | 6/2011 | Thomas |
| 2011/0185392 A1 | 7/2011 | Walker |
| 2012/0008917 A1 | 1/2012 | Katz et al. |
| 2012/0011226 A1 | 1/2012 | Katz et al. |
| 2012/0131218 A1 | 5/2012 | Putterman et al. |
| 2014/0040938 A1 | 2/2014 | Thomas et al. |

FOREIGN PATENT DOCUMENTS

| | | |
|---|---|---|
| EP | 2 256 115 | 11/1992 |
| EP | 0 535 749 | 4/1993 |
| EP | 0 572 090 | 12/1993 |
| EP | 0 605 115 | 7/1994 |
| EP | 0 624 039 | 11/1994 |
| EP | 0 662 771 | 7/1995 |
| EP | 0 673 160 | 9/1995 |
| EP | 0 682 452 | 11/1995 |
| EP | 0 711 076 | 5/1996 |
| EP | 0 725 539 | 8/1996 |
| EP | 0 753 964 | 1/1997 |
| EP | 0753964 | 1/1997 |
| EP | 0 758 833 | 2/1997 |
| EP | 0 762 756 | 3/1997 |
| EP | 0 763 938 | 3/1997 |
| EP | 0762756 | 3/1997 |
| EP | 0 424 469 | 5/1997 |
| EP | 0 862 833 | 5/1997 |
| EP | 0 836 321 | 4/1998 |
| EP | 0 854 645 | 7/1998 |
| EP | 0 673 160 | 8/1998 |
| EP | 0 874 524 | 10/1998 |
| EP | 0 924 927 | 6/1999 |
| EP | 0 932 275 | 7/1999 |
| EP | 0 940 985 | 9/1999 |
| EP | 0 944 253 | 9/1999 |
| EP | 0 944 257 | 9/1999 |
| EP | 0940985 | 9/1999 |
| EP | 1 099 341 | 1/2000 |
| EP | 0 986 046 | 3/2000 |
| EP | 0 821 856 | 6/2001 |
| EP | 0 806 111 | 10/2001 |
| EP | 1 213 919 | 6/2002 |
| EP | 1 217 787 | 6/2002 |
| EP | 1217787 | 6/2002 |
| EP | 1217787 A2 | 6/2002 |
| EP | 0 969 662 | 7/2002 |
| EP | 1 237 372 | 9/2002 |
| EP | 1377049 A1 | 1/2004 |
| EP | 1 244 300 | 1/2005 |
| EP | 0 880 856 | 3/2005 |
| EP | 1 687 951 | 5/2005 |
| EP | 0 757 873 | 3/2006 |
| EP | 1 427 148 | 6/2006 |
| EP | 1427148 | 6/2006 |
| EP | 1 377 049 | 8/2006 |
| EP | 1 763 234 | 3/2007 |
| EP | 1 613 066 | 6/2007 |
| EP | 1796393 A1 | 6/2007 |
| EP | 1 327 209 | 8/2008 |
| EP | 2174484 A1 | 4/2010 |
| GB | 2 256 115 | 11/1992 |
| JP | 60/061935 | 9/1985 |
| JP | 06111413 | 4/1994 |
| JP | 06303541 | 10/1994 |
| JP | 07-336318 | 12/1995 |
| JP | 08-317331 | 11/1996 |
| JP | 09 138804 | 5/1997 |
| JP | 09-182035 | 7/1997 |
| JP | 09-214873 | 8/1997 |
| JP | 10 065978 | 3/1998 |
| JP | H10-65978 | 3/1998 |
| JP | 11 032272 | 2/1999 |
| JP | 11-177962 | 7/1999 |
| JP | 11 205711 | 7/1999 |
| JP | H11-177962 | 7/1999 |
| JP | 11-341040 | 12/1999 |
| JP | H11-341040 | 12/1999 |
| JP | 2000-004272 | 1/2000 |
| JP | 2001-204001 | 7/2001 |
| JP | 2002-063385 A | 2/2002 |
| JP | 2002-176610 | 6/2002 |
| JP | 2003-162444 | 6/2003 |
| JP | 2003-209893 | 7/2003 |
| JP | 2004-080083 | 3/2004 |
| JP | 2005-117236 A | 4/2005 |
| JP | 2006-088052 | 3/2006 |
| KR | 1999-0086454 | 12/1999 |
| KR | 2000-0059522 | 10/2000 |
| RO | 247388 | 10/1994 |
| WO | WO 88/04507 | 6/1988 |
| WO | WO 89/12370 | 12/1989 |
| WO | WO 90/00847 | 1/1990 |
| WO | WO 91/00670 | 1/1991 |
| WO | WO 91/07050 | 5/1991 |
| WO | WO 92/04801 | 3/1992 |
| WO | WO-9222983 A2 | 12/1992 |
| WO | WO 93/08542 | 4/1993 |
| WO | WO 93/22877 | 11/1993 |
| WO | WO 95/01058 | 1/1995 |
| WO | WO 95/04431 | 2/1995 |
| WO | WO 95/15658 | 6/1995 |
| WO | WO 95/31069 | 11/1995 |
| WO | WO 95/32583 | 11/1995 |
| WO | WO 95/32584 | 11/1995 |
| WO | WO 95/32585 | 11/1995 |
| WO | WO 95/32587 | 11/1995 |
| WO | WO 96/09721 | 3/1996 |
| WO | WO 96/17467 | 6/1996 |
| WO | WO 96/25821 | 8/1996 |
| WO | WO 96/31980 | 10/1996 |
| WO | WO 96/33572 | 10/1996 |
| WO | WO 96/34467 | 10/1996 |
| WO | WO 96/34491 | 10/1996 |
| WO | WO 96/41472 | 12/1996 |
| WO | WO 96/41478 | 12/1996 |
| WO | WO 97/13368 | 4/1997 |
| WO | WO-9719555 A1 | 5/1997 |
| WO | WO 97/21291 | 6/1997 |
| WO | WO 97/32434 | 9/1997 |
| WO | WO 97/34413 | 9/1997 |
| WO | WO 97/34414 | 9/1997 |
| WO | WO 97/37500 | 10/1997 |
| WO | WO 97/42763 | 11/1997 |
| WO | WO 97/46016 | 12/1997 |
| WO | WO 97/46943 | 12/1997 |
| WO | WO 97/47124 | 12/1997 |
| WO | WO 97/48228 | 12/1997 |
| WO | WO 97/49237 | 12/1997 |
| WO | WO 98/01995 | 1/1998 |
| WO | WO 98/07277 | 2/1998 |
| WO | WO 98/10589 | 3/1998 |
| WO | WO 98/12872 | 3/1998 |
| WO | WO 98/17033 | 4/1998 |
| WO | WO 98/17064 | 4/1998 |
| WO | WO 98/18260 | 4/1998 |
| WO | WO 98/19459 | 5/1998 |
| WO | WO 98/26528 | 6/1998 |
| WO | WO 98/26584 | 6/1998 |
| WO | WO 98/26596 | 6/1998 |
| WO | WO 98/31115 | 7/1998 |
| WO | WO 98/31116 | 7/1998 |
| WO | WO 98/34405 | 8/1998 |
| WO | WO 98/38831 | 9/1998 |
| WO | WO 98/47279 | 10/1998 |
| WO | WO 98/47283 | 10/1998 |
| WO | WO 98/48566 | 10/1998 |
| WO | WO 9853611 | 11/1998 |
| WO | WO 99/03267 | 1/1999 |
| WO | WO 99/04561 | 1/1999 |
| WO | WO 99/11060 | 3/1999 |

(56) References Cited

FOREIGN PATENT DOCUMENTS

| | | |
|---|---|---|
| WO | WO 99/12320 | 3/1999 |
| WO | WO 99/14945 | 3/1999 |
| WO | WO 99/27681 | 6/1999 |
| WO | WO 99/28897 | 6/1999 |
| WO | WO 99/35753 | 7/1999 |
| WO | WO 99/39466 | 8/1999 |
| WO | WO 99/56473 | 11/1999 |
| WO | WO 99/60790 | 11/1999 |
| WO | WO 99/64969 | 12/1999 |
| WO | WO 99/65244 | 12/1999 |
| WO | WO 99/66725 | 12/1999 |
| WO | WO 00/04706 | 1/2000 |
| WO | WO-0004707 A1 | 1/2000 |
| WO | WO-0004709 A1 | 1/2000 |
| WO | WO 00/05885 | 2/2000 |
| WO | WO 00/11869 | 3/2000 |
| WO | WO 00/16548 | 3/2000 |
| WO | WO 00/17738 | 3/2000 |
| WO | WO 00/30345 | 5/2000 |
| WO | WO 00/33208 | 6/2000 |
| WO | WO 00/33560 | 6/2000 |
| WO | WO 00/33565 | 6/2000 |
| WO | WO-0034891 A2 | 6/2000 |
| WO | WO 00/58967 | 10/2000 |
| WO | WO 00/59230 | 10/2000 |
| WO | WO 00/74383 | 12/2000 |
| WO | WO 01/01677 | 1/2001 |
| WO | WO 01/01689 | 1/2001 |
| WO | WO 0110126 | 2/2001 |
| WO | WO 01/35662 | 5/2001 |
| WO | WO 0147248 | 6/2001 |
| WO | WO 01/50743 | 7/2001 |
| WO | WO 0167772 | 9/2001 |
| WO | WO 03043326 | 5/2003 |
| WO | WO 03/046727 | 6/2003 |
| WO | WO 2004/032511 | 4/2004 |
| WO | WO 2004/061699 | 7/2004 |
| WO | WO 2007/078503 | 7/2007 |
| WO | WO-2009009106 A1 | 1/2009 |

OTHER PUBLICATIONS

U.S. Appl. No. 09/330,860, filed Jun. 11, 1999, Ellis.
U.S. Appl. No. 09/354,344, filed Jul. 16, 1999, Ellis.
Jaidev, "XSLT—A Wired and Wireless Case Study," http://csharpcomputing.com/XMLTutorial/Lesson15.htm.
Randerson, J., "Let Software Catch the Game for You," New Scientist, Jul. 3, 2004.
Papers Delivered (Part 1), 61$^{st}$ National Conference, Information Processing Society of Japan, Oct. 3-5, 2000.
Realplayer 8 Plus User Manual, Rev. 1, Real Networks, Inc. p. 32 (2000).
CableData brochure, "A New Approach to Addressability" (undated).
"Addressable Converters: A New Development at CableData," Via Cable, vol. 1, No. 12 (Dec. 1981).
Hofmann, et al., "Videotext Programmiert Videorecorder," Rundfunktechnische Mitteilungen, Nov.-Dec. 1982, pp. 254-257 (translation abstract attached).
Brugliera, V. "Digital On-Screen Display—A New Technology for the Consumer Interface," Symposium Record Cable Sessions, 18th International Television Symposium and Technical Exhibition, Montreux, Switzerland Jun. 10-15, 1993, pp. 571-586 (Jun. 11, 1993).
Miller, M. D. "A Scenario for the Deployment of Interactive Multimedia Cable Television Systems in the United States in the 1990's," Proceedings of the IEEE, vol. 82, No. 4, pp. 585-589 (Apr. 1994).
Chang, Y., et al., "An Open-Systems Approach to Video on Demand," IEEE Communications Magazine, vol. 32, No. 5 pp. 68-80 (May 1994).
"Electronic Programme Guide (EPG); Protocol for a TV Guide using electronic data transmission" by European Telecommunication Standards Institute, May 1997, Valbonne, France, publication No. ETS 300 707.

Article: "Windows 98 Feature Combines TV, Terminal and the Internet", New York Times, Aug. 18, 1998.
The New York Times Website Article, "2 Makers Plan Introductions of Digital VCR", by John Markoff, Mar. 29, 1999.
David M. Rudnick, U.S. Appl. No. 09/283,681, filed Apr. 1, 1999, entitled Interactive Television Program Guide System Having Graphic Arrangements of Program Event Regions.
"Digital Video Broadcasting (DVB); DVB specification for data broadcasting", European Telecommunications Standards Institute, Draft EN 301 192 V1.2.1 (Jan. 1999).
Li et al., "Distributed Multimedia Systems," *Proceedings of the IEEE* vol. 85 No. 7: pp. 1063-1108 (Jul. 1997).
S. Gondow, et al., "The Architecture of Communication Migration and Media State Management for Distributed Applications on Wearable Networks," Information Processing Society of Japan (National Conference Lecture Collected Paper), Tokyo, Japan, Oct. 3, 2000, pp. 1-2.
F. Teraoka et al., "Host Migration Transparancy in IP networks: The VIP Approach" ACM SIGCOMM—Computer Communication Review, ACM Press, New York, NY, USA, Jan. 1993, pp. 45-65.
A. C. Snoeren et al., "An End-to-End Approach to Host Mobility" 6th ACM/IEEE International Conference on Mobile Computing and Networking (MOBICOM 2000), Boston, MA, USA, Aug. 2000, pp. 1-12.
Dimitrova, et al. "Personalizing Video Recorders ing Multimedia Processing and Integration." ACM 2001.
Haas et al., Proceedings of ICIP 2002 Personalized News Through Content Augmentation and Profiling:, Rochester, NY, Sep. 2002.
"Rewind, reply and unwind with new high-tech TV devices," by Lawrence J. Magid, LA Times (This document was printed from the internet on Jun. 6, 1999 and bears a date of May 19, 1999).
Pham et al "Exploiting Location-Based Composite Devices to Support and Facilitate Situated Ubiquitous Computing," HUC 2000, LNCS 1927, pp. 143-156.
Arango et al., "The Touring Machine System," Communications of the ACM, Jan. 1993, vol. 36, No. 1, pp. 68-77.
Fortino et al., A Cooperative Playback System for On-Demand Multimedia Sessions over Internet, 2000 IEEE, pp. 41-44.
Han et al., "Dynamic Adaptation in an Image Transcoding Proxy for Mobile Web Browsing," IEEE Personal Communicatios, Dec. 1998, pp. 8-17.
Mah et al., "Providing Network Video Service to Mobile Clients," 1993 IEEE, pp. 48-54.
IBM Corporation "IBM Content Manager VideoCharger, New dimensions for enterprise content, DB2 Data Management Software" pp. 1-4, Mar. 2002.
IBM Corporation IBM VideoCharger for AIX Version 2.0 "Streaming the power of video to your desktop, pp. 1-5" Visit the IBM VideoCharger Website at: www.software.ibm.com/data/videocharger/.
IBM Corporation "IBM Content Manager VideoCharger, Version 8, New dimensions for enterprise content, DB2 Data Management Software, pp. 1-4," May 2002, Visit IBM Web site at ibm.com/software/data/videocharger.
IBM Corporation, "IBM Video Charger Server", pp. 102, Jun. 1998.
Telecommunications Information Networking Architecture Consortium "TINA-C Deliverable" Service Architecture, Version 5.0, Jun. 16, 1997 (167 pgs.).
C.S. Hong, et al. "A Networking Architecture for Mobility Services Using Mobile Agent Approach" Proceedings of the TINA '97—Global Convergence of Telecommunications and Distributed Object Computing 0-8186-8335-x/97, 1997 IEEE, (11 pgs).
A. Limongiello, et al. "An Experimental Open Architecture to Support Multimedia Services based on CORBA, Java and WWW Technologies, TELECOM Italia Headquarters" (undated) pp. 69-75.
"Don Imus: The Thinking Man's Shock Jock", Broadcasting Cable, Jun. 13, 1994, pp. 49-52.
"TV Listing Star on the Computer", Central Penn Business Journal/HighBeam Research, pp. 1-4, Mar. 15, 1996.
Abarca, C. et al., Telecommunications Information Networking Architecture Consortium, Service Architecture, Version 5.0, Jun. 16, 1997, 168 pages.

(56) References Cited

OTHER PUBLICATIONS

Bestler, C. et al., "Flexible Data Structures and Interface Rituals for Rapid Development of OSD Applications", published NCTA Technical Papers, pp. 223-236, 1993.
Cable Data: Via Cable, vol. 1, No. 12, Addressable Converters: A New Development at CableData, 11 pages, Dec. 1981.
Davic 1.3.1 Specification Part 1, Published in 1998 by Digital Audio-Visual Counsel (86 pages).
Davis, B., "Violence on Television", TV Guide on Screen to the US House of Representatives Committee of Energy and Commerce Subcommittee on Telecommunications and Finance, pp. 93-163, Jun. 25, 1993.
December, J., "Understanding the Potential of Java and the Web", Presenting Java, published Sep. 20, 1995.
Federighi, C. et al. "A Distributed Hierarchical Storage Manager for a Video-on-Demand System", Storage and Retrieval for Image and Video Databases II, IS&T/SPIE, Symp. on Elec. Imaging Sci. & Tech., San Jose, CA, pp. 1-13, Feb. 1994.
Rowe, L., et al., A Continuous Media Player, Proc. 3rd Int. Workshop on Network and OS Support for Digital Audio and Video (Nov. 1992).
Schroeder, T. et al. "Scalable Web Server Clustering Technologies", University of Nebraska—Lincoln CSE Journal Articles, Department of Computer Science and Engineering, pp. 38-45, Jun. 1, 2000.
Thesis of Bo Zou "Mobile IDS Protocol: A badge-activated application level handoff of a multimedia streaming to support user mobility" (Aug. 2000) available at the website of the Multimedia Operating System and Networking Group of the University of Illinois.
Third Party Submission Under 37 CFR 1.290 filed Jul. 31, 2013, U.S. Appl. No. 13/181,915 Concise Description of Relevance, (30 pages).
Uniden UST-4800 Integrated Receiver/Descrambler, Installation Guide, Installation Device, copyright 1990, Uniden America Corporation, 60 pages.
Uniden UST-4800 Super Integrated Receiver/Descrambler, Preliminary Reference Manual, 80 pages, Nov. 12, 1991.
Verma, D., "Content Distribution Networks—An Engineering Approach", p. 24-49, 2002.
Wedlund, Elin and Henning Schulzrinne, Mobility Support using SIP, § 4, ACM.
*Rovi et al. v. Hulu, LLC*, Central District of California Case No. 12-cv-04756, "Order Denying Hulu's Motion for Summary Judgment That the '906 Patent is Invalid," Feb. 5, 2013 (43 pages).
*Rovi et al.v. Hulu, LLC*, Central District of California Case No. 12-cv-04756, "Plaintiffs' Opposition to Hulu's Motion for Summary Judgment that the '906 Patent is Invalid" Dec. 17, 2012 (19 pages).
*Rovi et al.v. Hulu, LLC*, Central District of California Case No. 12-cv-04756, "Reporters Transcript of Motion Hearing Jan. 7, 2013" Jan. 16, 2013 (95 pages).
*Rovi et al.v. Hulu, LLC*, Central District of California Case No. 12-cv-04756, "Plaintiffs' Statement of Genuine Issues in Support of Plaintiffs Opposition to Defendant Hulu LLC's Motion for Summary Judgment that the '906 Patent is Invalid" Dec. 17, 2012 (36 pages).
ITC Investigation of Certain Products Containing Interactive Program Guide and Parental Control Technology, Investigation No. 337-TA-845, "Complainants' Opposition to Respondents' Contingent Petition for Review of Final Initial Determination" Jul. 2, 2013 (51 pages).
ITC Investigation of Certain Products Containing Interactive Program Guide and Parental Control Technology, Investigation No. 337-TA-845, "Final Initial Determination" Jun. 7, 2013 (375 pages) Parts 1 and 2.
ITC Investigation of Certain Products Containing Interactive Program Guide and Parental Control Technology, Investigation No. 337-TA-845, "Open Session Transcript" Mar. 5, 2013 (642 pages) Parts 1 and 2.
ITC Investigation of Certain Products Containing Interactive Program Guide and Parental Control Technology, Investigation No. 337-TA-845, "Respondents' Notice of Prior Art" Oct. 12, 2012 (39 pages).
ITC Investigation of Certain Products Containing Interactive Program Guide and Parental Control Technology, Investigation No. 337-TA-845, "Respondents' Response to the Commission's Determination to Review the Final Initial Determination" Aug. 26, 2013 (62 pages).
ITC Investigation of Certain Products Containing Interactive Program Guide and Parental Control Technology, Investigation No. 337-TA-845, "Complainants' Reply Submission in Response to Commission's Determination to Review the Final Initial Determination" Aug. 30, 2013 (32 pages).
ITC Investigation of Certain Products Containing Interactive Program Guide and Parental Control Technology, Investigation No. 337-TA-845, "Respondents Netflix, Inc.'s and Roku, Inc.'s Response to Complainants' Initial Submission in Response to Commission's Determination to Review the Final Initial Determination" Aug. 30, 2013 (43 pages).
ITC Investigation of Certain Products Containing Interactive Program Guide and Parental Control Technology, Investigation No. 337-TA-845, "Notice of the Commission's Final Determination Finding No Violation of Section 337; Termination of the Investigation" Nov. 1, 2013 (4 pages).
ITC Investigation of Certain Products Containing Interactive Program Guide and Parental Control Technology, Investigation No. 337-TA-845, "Commission Opinion" Dec. 11, 2013 (27 pages).
ITC Investigation of Certain Products Containing Interactive Program Guide and Parental Control Technology, Investigation No. 337-TA-845, "Respondent Netflix Response to Complaintants' Petition for Review" Jul. 12, 2013 (64 pages).
ITC Investigation of Certain Products Containing Interactive Program Guide and Parental Control Technology, Investigation No. 337-TA-845, "Respondent Netflix, Inc.'s Summary of Issues for Its Repsonse to Complainants Petition for Review" Jul. 12, 2013 (6 pages).
ITC Investigation of Certain Products Containing Interactive Program Guide and Parental Control Technology, Investigation No. 337-TA-845, "Notice of Commission Determination to Review in Its Entirety A Final Initial Determination Finding No Violation of Section 337" Aug. 9, 2013 (6 pages).
ITC Investigation of Certain Products Containing Interactive Program Guide and Parental Control Technology, Investigation No. 337-TA-845, Complainants' Initial Submission in Response to Commission's Determination to Review the Final Initial Determination Aug. 23, 2013 (55 pages).
Inouye et al., "System Support for Mobile Multimedia Applications", Proc. of the 7th Intl. Workshop on Network and Operating System Support for Digital Audio and Video, 1997, pp. 143-154.
Sandsta et al., "Design and Implementation of the Elvira Video Server," Norwegian Computer Science Conference NIK'96 (Norsk lnformatikkonferanse), 1996, pp. 259-270.
Singru et al., "Framework for Interactive Video-On-Demand Service", Proc. of the IEEE 14th Annual Intl. Phoenix Conf. on Computer and Communications, 1995, pp. 636-642.
Smith, John R., "Digital Video Libraries and the Internet", IEEE Communications Magazine, 1999, vol. 37, pp. 92-97.
Smith et al., "Transcoding Internet Content for Heterogeneous Client Devices", Proc. IEEE Int. Conf. on Circuits and Syst. (ISCAS), May 1998, pp. 599-602.
"Digital Video Broadcasting (DVB); DVB specification for data broadcasting", European Telecommunications Standards Institute, Draft EN 301 192 V1.2.1 (Jan. 1999) (33 pgs).
"Rewind, reply and unwind with new high-tech TV devices," by Lawrence J. Magid, LA Times (This document was printed from the internet on Jun. 6, 1999 and bears a date of May 19, 1999) (4 pgs).
"Windows 98 Feature Combines TV, Terminal and the Internet", New York Times, Aug. 18, 1998 (1 page).
"Addressable Converters: A New Development at CableData," Via Cable, vol. 1, No. 12 (Dec. 1981) (11 pgs).
"Don Imus: The Thinking Man's Shock Jock", Broadcasting Cable, Jun. 13, 1994, pp. 49-52 (6 pages).
"Introducing VideoShare.com; *Consumers and Small Businesses Can Now Create and Add Video to All Web-Based Communications*". Business Wire, Mar. 8, 2000. Complete text, (Abstract). Gale Group PROMT [online]. USA. [Recovered on Mar. 23, 2015]. Recovered from: ProQuest LLC.

(56) References Cited

OTHER PUBLICATIONS

"Play Time"—21st Century Home_Part 2, PC Computing Dec. 1999 (4 pages).
Realplayer 8 Plus User Manual, Rev. 1, Real Networks, Inc. p. 32 (2000) (4 pages).
Abarca, C. et al., Telecommunications Information Networking Architecture Consortium "TINA-C Deliverable" Service Architecture, Version 5.0, Jun. 16, 1997 (168 pages).
Bo Zou, "Mobile ID Protocol: A Badge-Activated Application Level Handoff of a Multimedia Streaming to Support User Mobility," 2000 (54 pages).
Brody, Information highway: The home front, Technology Review, vol. 96:6 (Aug./Sep. 1993), p. 30 (7 pages).
Brown, "Supporting user mobility", pp. 69-77, 1996 (9 pages).
Business Wire, Gemstar Adopts Shareholder Rights Plan and Amendments to Articles and Memorandum of Association, Jul. 12 1998, (2 pages).
Bwanausi, 'Daily News' Xones Into New Editions, ADWEEK Western Edition, Sep. 17 1990, p. 12.
Chawathe, Y., et al., "A Proxy Architecture for Reliable Multicast in Heterogeneous Environments", ACM Multimedia '98, Bristol, UK, pp. 151-159, 1998.
Cherrick et al., Individually addressable receiver with interactive channel guide display, VCR, and cable box control, IEEE Transactions on Consumer Electronics, 40:3 (1994), pp. 317-328.
Costello, On-screen TV program guides, Stereo Review, 60:8 (Aug. 1995), p. 20.
CV prof Klara Nahrstedt, https://wiki.engr.illinois.edu/display/monet/Klara+Nahrstedt, 2014, (2 pages).
DAVIC 1.3.1. Description of Digital Audio-Visual Functionalities 1998 (86 pages).
Decision of the Technical Board of Appeal 3.3.05, Feb. 2, 2012 (10 pages).
Declaration of David King, executed Mar. 21, 2013 (11 pages).
Dias, D. "A Scalable and Highly Available Web Server", IEEE, Proceedings of COMPCON '96, p. 85-92, 1996.
Dimitrova, et al. "Personalizing Video Recorders in Multimedia Processing and Integration." ACM 2001 (4 pages).
Email Bo Zou, Jan. 6, 2012 (1 page).
Email Hong dated Nov. 1, 2012 (2 pages).
Email Klara Nahrstedt, Jan. 20, 2012 (1 page).
Email Roy Campbell, Jan. 18, 2012 (1 page).
Email Wojtowicz dated Nov. 12, 2012 (2 pages).
EP 99963412.4 Official Communication dated Mar. 6, 2007 (80 pages).
EP 99963412.4 Official Communication dated Oct. 21, 2010 (8 pages).
Fall, A Peer—to—Peer I/O System in Support of I/O Intensive Workloads, PhD Dissertatioon, University of California, San Diego (1994) (133 pages).
Fox, A., et al., Adapting to Network and Client Variation Using Infrastructural Proxies: Lessons and Perspectives, Personal Communications IEEE, pp. 10-19 (Aug. 1998) (15 pages).
Gemstar, Gemstar Buys VideoGuide Stake, Consumer Electronics, Feb. 26, 1996, p. 11.
Goncalves et al. "Video-On-Demand Provision Using TINA", 2000 (6 pages).
Gondow, S., et al., "The Architecture of Communication Migration and Media State Management for Distributed Applications on Wearable Networks," Information Processing Society of Japan (National Conference Lecture Collected Paper), Tokyo, Japan, Oct. 3, 2000, pp. 1-2.
Haas et al., Proceedings of ICIP 2002 Personalized News Through Content Augmentation and Profiling:, Rochester, NY, Sep. 2002 (4 pgs).
Hodge et al., Video on demand: architecture, systems, and applications, Selected Papers from the SMPTE Advanced Television and Electronic Imaging Conference, Feb. 4, 1994, pp. 120-132.
Huyng "Implementations of User Mobility Support for UPC in JAVA/CORBA Environment," The University of British Columbia, Aug. 1999 (86 pages).
Isobe at al., Interactivity in broadcasting and its application to ISDB service, IEEE Transactions on Broadcasting, vol. 42:3 (Sep. 1996), pp. 179-185.
ITC Investigation of Certain Products Containing Interactive Program Guide and Parental Control Technology, Investigation No. 337-TA-845, "Complainants' Petition for Review of Final Initial Determination" Jun. 24, 2013 (55 pages).
ITC Investigation of Certain Products Containing Interactive Program Guide and Parental Control Technology, Investigation No. 337-TA-845, "Order Denying Summary Determination Motions" Mar. 4, 2013 (6 pages).
ITC Investigation of Certain Products Containing Interactive Program Guide and Parental Control Technology, Investigation No. 337-TA-845, "Respondents Netflix, Inc. and Roku, Inc.s Contingent Petition for Review" Jun. 24, 2013 (53 pages).
Jaidev, "XSLT—A Wired and Wireless Case Study," http://csharpcomputing.com/XMLTutorial/Lesson15.htm. Oct. 14, 2005 (6 pgs).
Letter from Delphine Kranz, University of Illinois at Urbana-Champaign, dated Feb. 6, 2012 (1 page).
Li et al., Vision: a digital library, Proceedings of the ACM Conference on Digital Libraries, Mar. 20-23, 1996, pp. 19-27.
Limongiello, A. et al., "An Experimental Open Architecture to Support Multimedia Services based on CORBA, Java and WWW Technologies", Intelligence in Services and Networks: Technology for Cooperative Competition, Fourth International Conference on Intelligence in Services and Networks, IS&N'97, May 27-29, 1997, pp. 69-75.
McNab et al., A distributed digital library architecture incorporating different index styles, IEEE International Forum on Research and Technology Advances in Digital Libraries, Apr. 22-24, 1998, pp. 36-45.
Mobile Agent Approach, Global Convergence of Telecommunications and Distributed Object Computing, pp. 297-307 (1997), Section 8.4: X.
MONET: Multimedia Operating System and Networking Group http://cairo.cs.uiuc.edu/publications/view.php?action=list&area=all &type=master, Sep. 21, 2011 (5 pages).
Moss, 500 Channels Awe Advertisers, Multichannel News (Apr. 19, 1993), p. 1A.
Nahrstedt and Feng, "Multimedia Computing and Networking 2000", pp. 196-203 (Jan. 24-26, 2000) (9 pages).
*Netflix, Inc. v. Rovi Corporation et al.*, Netflix's Joint Claim Cosntruction and Prehearing Statement Pursuant to Patent Local Rule 4-3, dated Dec. 19, 2014, 23 pages.
*Netflix, Inc. v. Rovi Corporation et al.*, Netflix's Responsive Claim Construction Brief, dated Feb. 18, 2015, 30 pages.
*Netflix, Inc. v. Rovi Corporation et al.*, Redacted Version of Motion for Summary Judgment of Invalidity Under 35 U.S.C. § 101, dated Dec. 15, 2014, 30 pages.
*Netflix, Inc. v. Rovi Corporation et al.*, Rovi's Opening Claim Construction Brief Pursuant to Patent Local Rule 4-5, dated Jan. 30, 2015, 30 pages.
*Netflix, Inc. v. Rovi Corporation et al.*, Rovi's Opposition to Netflix's Motion for Summary Judgment of Invalidity Under 35 U.S.C. § 101, dated Jan. 30, 2015, 33 pages.
*Netflix, Inc. v. Rovi Corporation et al.*, Rovi's Reply Claim Construction Brief Pursuant to Patent Local Rule 4-5, dated Mar. 2, 2015, 22 pages.
Nichols, On-screen guide to TV schedules can program a VCR, Too, Times Topics, New York Times Company, Jun. 26, 1995 (3 pages).
Pohlman, House Calls, Video Magazine, vol. 20:6 (Oct. 1996), pp. 25-27.
PR Newswire, NextLevel Systems, Inc. and nCUBE demonstrate their integrated near-video-on-demand solution on NextLevel's advanced analog CFT 2200 platform, Dec. 10 1997 (3 pages).
Premium Channels Publishing Company Inc., Premium channels publishing will market a weekly program guide listing pay TV, cable and broadcast offerings by daypart, Cable Television Business, Nov. 15, 1982, p. 194.

(56) References Cited

OTHER PUBLICATIONS

Reed "Room to room video", Popular Science, May 1991, pp. 96-98 (3 pages).

*Rovi et al.* v. *Hulu, LLC*, Central District of California Case No. 12-cv-04756, "Defendant Hulu's Memorandum of Points and Authorities in Support of Hulu's Motion for Summary Judgment That the '906 Patent is Invalid" Dec. 3, 2012 (32 pages).

*Rovi et al.* v. *Hulu, LLC*, Central District of California Case No. 12-cv-04756, "Reporter's Transcript of Motion Hearing Jan. 7, 2013" Jan. 16, 2013 (95 pages).

Rudnick, U.S. Appl. No. 09/283,681, filed Apr. 1, 1999, entitled Interactive Television Program Guide System Having Graphic Arrangements of Program Event Regions. (35 pages).

Sandsta et al., "Design and Implementation of the Elvira Video Server," Norwegian Computer Science Conference NIK'96 (Norsk Informatikkonferanse), 1996, pp. 259-270.

Schmidt "Supporting Ubiquitous Computing with Stateless Consoles and Computation Caches" Aug. 2000 (140 pages).

Scully, Digital librarian could prove PPV boon, Broadcasting & Cable, Jun. 7, 1993, p. 97.

Sorce, J. et al., "Designing a Broadband Residential Entertainment Service: A Case Study," 13th International Symposium Human Factors in Telecommunications, Torino, Italy, Sep. 10-14, 1990 pp. 141-148.

Tedesco, Thomson to produce RCA NC box for NetChannel, Broadcasting & Cable, 127:30, p. 100 (2 pages).

Third Party Submission Under 37 CFR 1.290 filed Jul. 31, 2013, U.S. Appl. No. 13/181,915 Concise Description of Relevance, (18 pages).

Time Warner Signs Tulsa Firm to Provide Cable Program Guide, Journal Record, May 25, 1994 (2 pages).

TINA-C, Business Model and Reference Points, Version 4.0, May 22, 1997 (68 pages).

TINA-C, Service Architecture, Version 5.0, Jun. 16, 1997 (168 pages).

Tsao et al., "An Efficient storage server in near video-on-demand systems," IEEE Transactions on Consumer Electronics, vol. 44(1):27-32 (Feb. 1998).

Uniden UST-4800 Integrated Receiver/Descrambler, Operating Guide, copyright 1990, Uniden America Corporation, 24 pages.

United Kingdom: BSKyB to launch integrated personal TV recorder, BBC Monitoring Media, Sep. 11, 2000 (3 pages).

United Media Enterprises, United Media Enterprises (New York, NY) affiliate 'TV Watch/DIP' now provides a monthly satellite print guide with schedules for all satellite and pay services, Satellite News, Dec. 24, 1980, p. 7 (1 page).

Using Smart Cards With the Sun Ray Enterprize Appliance, Sun Microsystems, Sep. 1999, (19 pages).

Wedlund, Elin and Henning Schulzrinne, Mobility Support using SIP, § 4, ACM (7 pages).

Zahariadis et al., "Interactive Multimedia Services to Residential Users," IEEE Communications Magazine, 1997, vol. 35, pp. 61-68.

Properties internet Bo Zou word doc (1 page).

Newsbytes, StarSight Telecast Offers Interactive TV Product, Jun. 2, 1995 (2 pages).

Pogue, D., "State of the Art: for TiVo and Replay, New Reach," N.Y. Times, May 29, 2003.

*Rovi et al.* v. *Hulu, LLC*, Central District of California Case No. 12-cv-04756, "Defendant Hulu's Reply Memorandum in Support of Hulu's Motion for Summary Judgment That the '906 Patent is Invalid" Dec. 26, 2012 (32 pages).

Scully, for some, interactive future is now, Broadcast & Cable, Jun. 1993, pp. 77-78.

Tedesco, TV-'Net vendors resist the marketing Web, Broadcasting & Cable, 127:21 (May 19, 1997), p. 55.

Tsao et al., A Novel Data Placement Scheme on Optical Discs for Near-VOD Servers, Interactive Distributed Multimedia Systems and Telecommunications Services Lecture Notes in Computer Science, vol. 1309 (1997), pp. 133-142.

*Netflix, Inc.* v. *Rovi Corporation et al.*, Order Granting Motion for Summary Judgment, dated Jul. 15, 2015 (35 pages).

*Netflix, Inc.* v. *Rovi Corporation et al.*, Claim Construction Order dated Jul. 15, 2015 (20 pages).

* cited by examiner

USER CONTROLLED MULTI-DEVICE MEDIA-ON-DEMAND SYSTEM

CROSS REFERENCE TO RELATED APPLICATIONS

This application is a continuation of U.S. patent application Ser. No. 11/458,930, filed Jul. 20, 2006, currently pending, which is a division of U.S. patent application Ser. No. 09/676,545, filed Sep. 29, 2000, now U.S. Pat. No. 7,103,906, and both previous applications are hereby incorporated by reference herein in their entirety.

STATEMENT REGARDING FEDERALLY SPONSORED RESEARCH OR DEVELOPMENT (Not Applicable)

BACKGROUND OF THE INVENTION

1. Technical Field

The present invention relates to the field of multimedia transfer and control. More particularly, the instant invention relates to a method and apparatus for dynamically controlling and referencing digital media independent of the point of access.

2. Description of the Related Art

Users, both business and consumers, are increasingly becoming accustomed to having large amounts of digital data delivered from various media-on-demand (MOD) systems. The continuing evolution from narrowband to broadband networks has fueled a growing need for digital data delivery by facilitating the transmission of broadband data not only by wired means, but also by wireless means. For example, the Internet, with its myriad of text, audio and video content, and its omnipresent availability, can provide consumers with a wealth of information that is practically accessible from anywhere through numerous wired and wireless means. As networks which provide access to digital data continue to evolve, the networks improve their ability to more efficiently distribute and serve bandwidth demanding streaming audio and video content to consumers.

Various forms of wired access methodologies have been created to provide consumer access to the various broadband networks. For example, cable modem service provided by cable service operators can provide Local Area Network (LAN) type access speeds via the same coaxial cable that carries cable signals to the premises of a subscriber. The cable modems used in these systems can support transmission speeds on the order of several megabits per second depending upon whether the network is engineered to use a symmetrical or an asymmetrical topology. These systems are orders of magnitude faster than narrowband systems, which typically can provide transmission speeds ranging from 28 Kbps to 56 Kbps. Digital Subscriber Loop (DSL) technology also can provide broadband access to subscribers, albeit, through traditional Plain Old Telephone Service (POTS) copper twisted pair lines. DSL modems, although not as fast as cable modems today, are touted to provide downstream speeds approaching 2 Mbps and upstream speeds approaching 512 Kbps depending upon the underlying network implementation.

Several wireless access technologies have been used to provide broadband wireless access to consumers. For example, the Reunion Broadband Wireless Access (BWA) manufactured by Nortel Networks Corporation of Brampton, P.O. provides a digital point-to-multipoint technology operating at frequencies ranging from 24 GHz to 38 Ghz. Additionally, Bluetooth™, a wireless technology for providing a short range radio link between various small form factor data devices, can operate at 2.45 GHz with transmission speeds of 721 Kbps. Finally, various other technologies, such as Fixed Wireless Loop, Wireless Local Loop, Local Multipoint Distribution System (LMDS) and Multichannel Multipoint Distribution System (MMDS) have be used to provide broadband access to subscribers.

The growth and gradual switch from narrowband to broadband access and services has eased user access to digital media by decreasing download time, consequently increasing user willingness to access digital media networks. This growth in network access and subscriber willingness has fueled the need to provide subscriber terminals to access the various broadband services. Typical subscriber access devices include, PCs, TVs, set-top boxes, handheld computers, wireless LAN devices, and audio devices that have the capability to download digital media content from the Internet for later playback and viewing.

Consequently, a new problem of user/subscriber control over the transmission of digital media has arisen from the development of MOD services, broadband access and the existence of a myriad of access devices, each having its own capabilities and access characteristics. Current systems lack functionality for accessing specific digital media on a first access device in a viewing session, and subsequently continuing the viewing session by allowing access of the same digital media from a second access device. For example, with present systems, a user viewing a movie delivered through a TV at home, cannot terminate the delivery of the movie only to resume the delivery of the same movie at a later time. Additionally, current systems do not permit one to resume delivery of a movie at a later time through a different access device, for example a PC. Finally, current systems do not permit the resumption of the delivery of the movie to an access device positioned in a location that differs from that in which the original access began, namely, the home. Accordingly, given the limitations and inflexibility present in current MOD systems, there exists a need to provide a more efficient and flexible system and method for providing configurable access to digital media in a MOD system.

SUMMARY OF THE INVENTION

The present invention can include a method for providing configurable access to media in a media-on-demand system. The method can include the steps of delivering the media to a first client device through a first communications link; recording a bookmark specifying a position in the media; and delivering the media to a second client device through a second communications link. Significantly, the delivery to the second client device can begin at the position specified by the recorded bookmark. The method can further include the steps of identifying device properties for each of the first and second client devices; and, delivering the media to the first and second client devices through the respectively established first and second communications links. Notably, the client device properties can include the client device type, particular media formats which can be processed by the client device and the type of communications link which can be supported by the client device.

In one aspect of the present invention, the media can be delivered to first and second client device sessions through first and second communications links respectively. Generally, in this aspect of the present invention, the first and second client device sessions can reside in a single client device.

However, the invention is not limited in this regard and the first and second client device sessions can reside in first and second client devices.

Notably, the media can be delivered in a format compatible with the identified device properties. Specifically, in one aspect of the invention, the media is stored in a media-on-demand server (MODS) and delivered to the first and the second client devices via the first and the second communications link respectively. In another aspect of the invention, the step of delivering the media to the first client device via the first communications link, can include receiving the media from the MODS in an intermediate server. In the intermediate server, the media can be converted to a format compatible with the identified device properties of the first client device; and the converted media can be delivered to the first client device via the first communications link.

In another aspect of the invention, the step of delivering the media to a second client device via the second communications link can include receiving the media in an intermediate server from the MODS. In the intermediate server, the media can be converted to a format compatible with the identified device properties of the second client device. Subsequently, the converted media can be delivered to the second client device via the second communications link.

In one aspect of the present invention, the method also can include the steps of storing the media in selected ones of a plurality of media-on-demand servers. Each MODS in the plurality of media-on-demand servers can store the media in at least one format compatible with a selected device type. A MODS can be selected for delivering the media to the first client device. The selected MODS can have stored thereon the media in a format compatible with the first client device. Subsequently, the media can be delivered from the selected MODS in a format compatible with the first client device. Likewise, a MODS can be selected for delivering the media to the second client device, wherein the selected MODS has stored thereon the media in a format compatible with the second client device. Subsequently, the media can be delivered from the selected MODS in a format compatible with the second client device.

The selecting step can further include determining if a MODS is available for delivering the media to the first client device in a format compatible with the first client device. If it is determined that a MODS is not available for delivering the media to the first client device in a format compatible with the first client device, a MODS can be selected for delivering the media to the first client device. Notably, the selected MODS can contain the media in a standard format. As such, the media in the standard format can be converted to a format compatible with the first client device.

Similarly, the selecting step can further include determining if a MODS is available for delivering the media to the second client device in a format compatible with the second client device. If it is determined that a MODS is not available for delivering the media to the second client device in a format compatible with the second client device, a MODS can be selected for delivering the media to the second client device. Notably, the selected MODS can contain the media in a standard format. As such, the media in the standard format can be converted to a format compatible with the second client device.

A method for providing configurable access to media in a media-on-demand system also can include delivering the media to a first client device in a format compatible with the first client device; interrupting the delivery of the media; recording a bookmark specifying a position in the media where the interruption occurred; and resuming delivery of the media to a second client device, the resumed delivery beginning at a position in the media specified by the recorded bookmark. The method further can include identifying device properties for each of the first and second client devices; delivering the media to the first client device in a format compatible with the identified device properties for the first client device; and, delivering the media to the second client device in a format compatible with the identified device properties for the second client device.

The present invention also can include a user-controlled media-on-demand system. The system can include a media-on-demand server (MODS) for delivering media to client device sessions; a first communications link between the MODS and a first client device session; a second communications link between the MODS and a second client device session; and, a bookmark in the MODS specifying a position in the delivered media. Notably, the MODS can deliver media to the first client device session over the first communications link. Similarly, the MODS can deliver the media to the second client device session over the second communications link beginning at the position specified by the bookmark. Notably, the first and second client device sessions can reside in first and second client device sessions. Alternatively, the first and second client device sessions can reside in a single client device.

In one aspect of the invention, the system can also include an intermediate server disposed between the MODS and the client devices. In particular, the intermediate server can receive the delivered media from the MODS. Also, the intermediate server can identify device properties for each of the client devices. In consequence, the intermediate server can convert the delivered media to a media format compatible with the identified device properties for each client device. Finally, the intermediate server can deliver the converted media to the client devices.

In another aspect of the invention, the system can include a plurality of media-on-demand servers. Each MODS in the plurality of media-on-demand servers can store media in at least one format compatible with a specific device type. Also, the system can include an intermediate server which can identify a device type of a client device. In consequence, the intermediate server can select a MODS in the plurality of media-on-demand servers for delivering the media to the client device. The selected MODS can store the media in a format compatible with the identified device type. Upon being selected, the MODS can deliver the media to the client device in the format compatible with the identified device type.

In yet another aspect of the present invention, the system can further include a backup MODS for storing media in a standard format compatible with a standard device type; and, a conversion filter in the intermediate server. The intermediate server can determine if a MODS in the plurality of media-on-demand servers is available for delivering the media to the client device in a format compatible with the client device. The intermediate server also can select the backup MODS if it is determined that no MODS is available for delivering media to the client device in a format compatible with the client device. The backup MODS can deliver the media to the intermediate server in the format compatible with the identified device type. As a result, the intermediate server can convert the media to a format compatible with the identified device type in the conversion filter.

BRIEF DESCRIPTION OF THE DRAWINGS

There are presently shown in the drawings embodiments which are presently preferred, it being understood, however, that the invention is not limited to the precise arrangements and instrumentalities shown, wherein.

DETAILED DESCRIPTION OF THE INVENTION

The present invention is a user-controlled, multi-device, media-on-demand system. The media-demand-system of the present system can provide users with the ability to receive delivered media across a network in a client device through a communications link to a media-on-demand server (MODS) regardless of the properties of the client device and the characteristics of the communications link. Specifically, the MODS can deliver particular media to the client device in a format consonant with the properties of the client device which can include device type, acceptable media format and communications link speed and reliability.

Significantly, the user can interrupt the delivery of the delivered media to a client device session in a client device, and subsequently the user can resume the delivery of the delivered media in a seamless manner. Notably, the delivery can resume in a new client device session in a different client device, or in a new client device session in the same client device as the initial client device session. Additionally, the delivery can resume regardless of the timing of the resumption of the delivery and of the properties of the client device through which the user receives the resumed delivery.

Specifically, the user can resume the delivery of a previously interrupted reception of delivered media through a particular client device and a corresponding communications link each of which may have properties which differ from the client device and corresponding communications link of the interrupted delivery. Upon resumption of the delivery, the properties of the new client device can be determined and the format of the delivered media dynamically changed to accommodate the new client device. Moreover, the delivery can resume at a position in the delivered media corresponding to the position in the delivered media which had been most recently delivered to the client device prior to the interruption.

Figure 1:
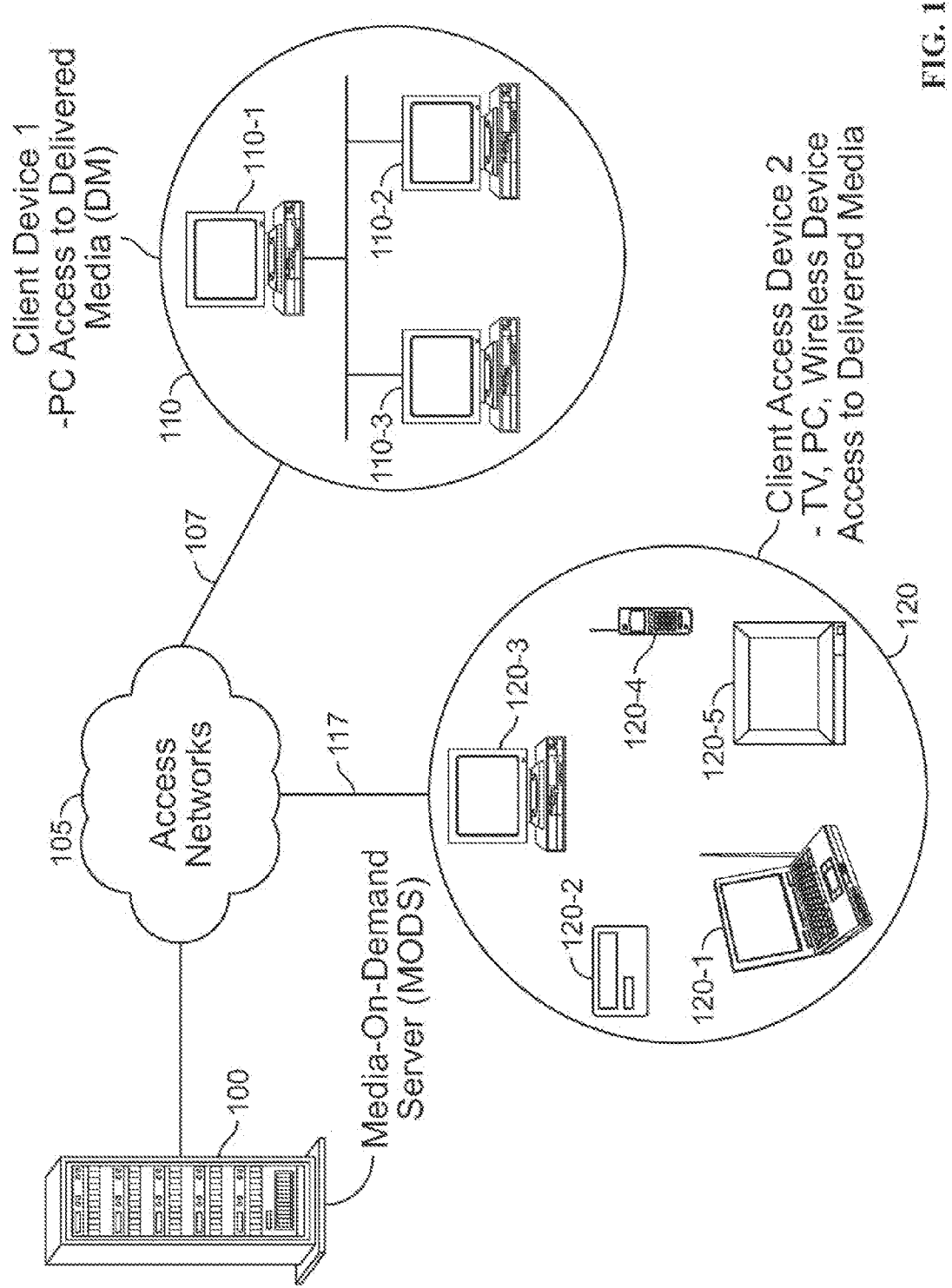
FIG. 1 is an exemplary network architecture diagram illustrating various network entities of the invention.

FIG. 1 is an exemplary network architecture diagram illustrating the various network entities of the invention in accordance with the inventive arrangements. As illustrated in the figure, the major network entities can include a MODS 100, Access Networks 105 and a first client access device 110 exemplarily illustrated as PC Access to Delivered Media consisting of computers 110-1, 110-2 and 110-3. A second client access device 120 is exemplarily illustrated as a TV, PC, Wireless Device Access to Delivered Media consisting of a laptop computer 120-1, a handheld device 120-2, a desktop computer 120-3 and a wireless telephone 120-4.

Client access devices (client devices) 110 and 120 are connected to access networks 105 via connections 107 and 117. Connections 107 and 117 may be wired or wireless connections. Typical wired connections include but are not limited to narrowband POTS, xDSL, Hybrid Fiber Coaxial (HFC) and cable, which can utilize twisted pair copper wires, coaxial cable, fiber or any combination thereof. Typical wireless connections include but are not limited to Cellular, PCS, CDPD, GPRS and Bluetooth each which typically operate at frequencies in the range of 900 MHz to 38 GHz.

The MODS 100 can be comprised of a plurality of access interfaces since it supports access by different kinds of client devices. For example, the MODS 100 can have a Ethernet interface that supports a TCP/IP stack, an X.25 interface to support communication with public data networks that utilize the X.25 protocol, or a T1 interface to support traffic from a public switched telephone network (PSTN).

In addition to supporting various access methodologies, the MODS 100 can store delivered media in a variety of formats, wherein each format is compatible with a particular type of client access device. For example, the MODS 100 may store particular delivered media in MPEG1, MPEG2, Digital Video Broadcast, Quicktime, etc. As a result, the ability to store delivered media in different formats provides the flexibility to serve delivered media to differing types of client devices.

Alternatively, the MODS 100 merely can store a single default format of the delivered media. However, when a request for delivered media is received from a client device having a particular device type, the MODS 100 can identify the device type and transcode or convert the delivered media from the default format to a format compatible with the identified client device type. For example, if the device type of client access device 120-1 can process delivered media formatted in the WML protocol, upon receiving a request for delivered media from the client access device 120-1, the MODS 100 can transcode the delivered media from the default format to WML.

In one representative embodiment of the invention, whenever a client device, for example client device 110, attempts to access delivered media services through the MODS 100, the MODS 100 can attempt to identify device type of the client device 110. In particular, the MODS 100 can send an initial query to the client device 110 requesting that the client device 110 report its device type. Alternatively, the client device 110 can transmit the device type indication with the initial access request. Hence, the client device type can be identified with a minimum of communications required.

Figure 2:
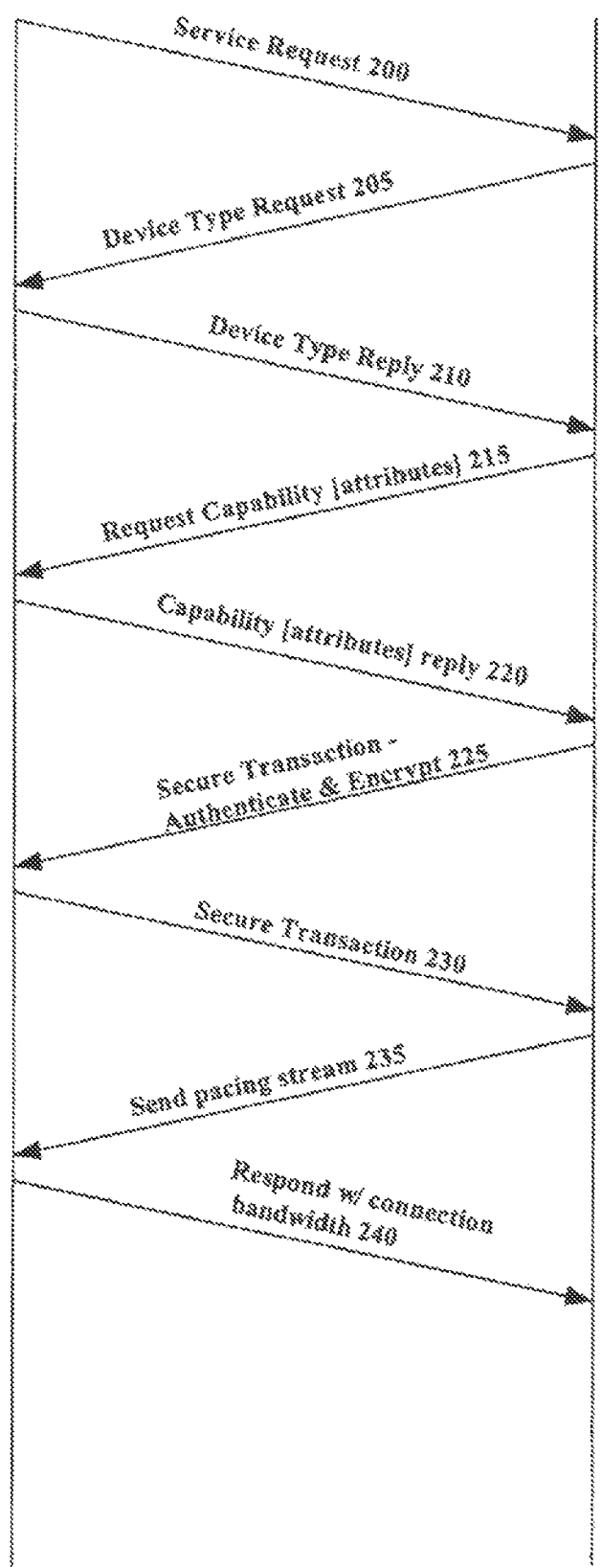
FIG. 2 is an exemplary flow diagram illustrating the messaging that occurs between a client device and a MODS in the startup process.

FIG. 2 illustrates an exemplary startup sequence between the MODS 100 and a client device 110-1. As shown in the figure, client device 110-1 can request media delivered from a MODS 100 and can issue a service request 200. MODS 100 can respond with a query 205, requesting the device type for client device 110-1. Client device 110-1 can respond with a device type reply 210. In addition to identifying the client device type, the MODS 100 can request additional information about the configuration of the client device 110-1 by issuing a capability request 215 to the client device 110-1. The client device 110-1 can report its configuration with a capability reply message 220. Alternatively, the MODS can assume a default configuration based on the device type provided in the device type reply 210.

Configuration information can include, but is not limited to screen characteristics, such as size, color or grayscale, I/O capabilities such as speakers, printer types, supported media formats and buffer size. While it might be preferable to acquire the configuration information dynamically, it should readily be understood by one skilled in the art that alternative methods are possible without departing from the spirit of the invention. For example, the client device configuration information could be acquired at the time a user subscribes to a delivered media subscription. Alternatively, the client device configuration information can be provided manually. Finally, the client device configuration information can be acquired from client device configuration data which can be pre-stored in a database and indexed according to client device type or user.

In a representative embodiment of the present invention, the client device 110-1 can have corresponding configuration information which has been pre-stored in static memory of the client device, such as a Read-Only-Memory (ROM). In consequence, the configuration information can be transferred electronically to the MODS 100 over the network 105, either at the initial access or when the client device 110-1 accesses the network 105. In the latter case, if there are changes to the client device configuration, the ROM can be reprogrammed such that the updated client device information can remain available to the MODS 100.

Returning now to FIG. 2, the delivery of media from the MODS 100 to clients 100 can be a for-fee service wherein the user pays a fee in exchange for the on-demand delivery of media content, for example a movie or song. Accordingly, for security purposes, an authentication exchange between the client device 110 and the MODS 100 can be used to facilitate access to services and billing. There are various methods that are well known in the art that can be used to authenticate and grant access to particular network services. For example, the Secured Socket Layer (SSL) protocol uses a public key cryptography to authenticate and encrypt information that is transferred over the Internet using TCP/IP. Authentication and encryption can be used to secure the transmission of transaction messages 225 and 230 which can further the goals of ensuring a secure transaction.

Due to the varied nature of the type of communication links that can be used for communication between the client device 110-1 and the MODS 100, the MODS 100 can attempt to evaluate the connection by using, for example, pacing stream 235. Hence, MODS 100 could use the pacing stream 235 consisting of a regulated stream of messages sent to client device 110-1, in order to ascertain the bandwidth of the connection. Metrics such as the arrival times and the interstitial times can be measured by the client device 110-1 and reported to the MODS 100 through a respond with bandwidth message 240. These metrics then can be used to determine network latency and the bandwidth requirements. Although the metrics can be measured by the MODS 100, in one representative embodiment, the metrics are measured by the client device 110-1.

Figure 3:
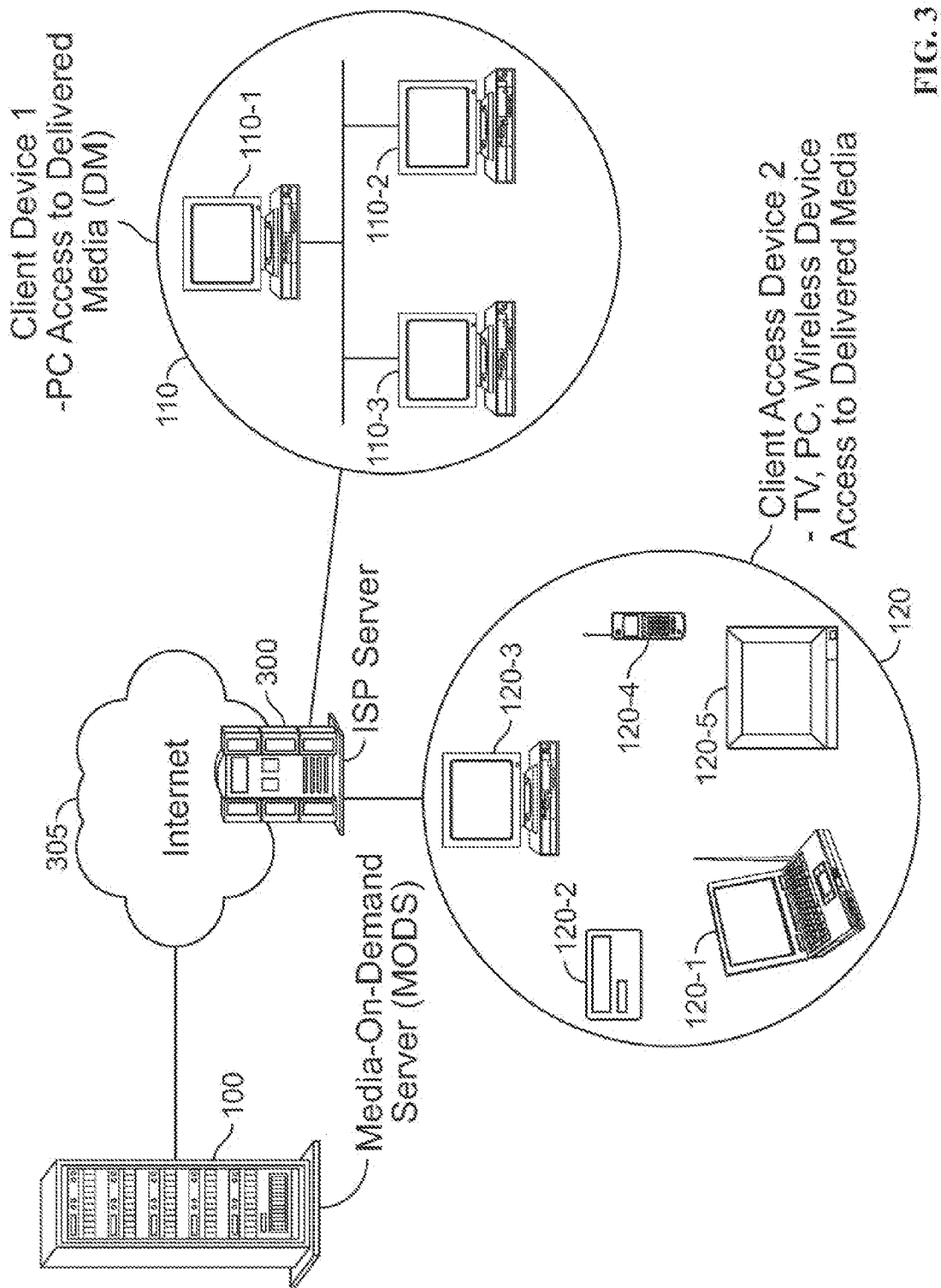
FIG. 3 illustrates an alternate network architecture for the network illustrated in FIG. 1, wherein the MODS is mediated by an ISP.

Referring now to FIG. 3, an alternative architecture to that disclosed in FIG. 1 is shown, wherein access to the MODS 100 is mediated by an ISP server 300. From a network provider perspective, the MODS 100 does not have to be the same operating entity as that of the ISP server 300. Hence, whenever the client device 110-1 attempts to access a service offered by the MODS 100, the ISP 300 can mediate the transaction. Specifically, in one embodiment of the invention, a capability exchange can precede the MODS transaction for the delivered media. During the capability exchange, the ISP 300 can query the client device 110-1 for the client device type and can mediate the transaction between the MODS 100 and the client device 110-1 according to the identified client device type. In a further aspect of the invention, since the MODS 100 can store the delivered media, the delivered media can be sent to the client device 110-1 through the ISP server 300.

Significantly, the MODS 100 can store bookmarks within the local memory of the MODS 100. The bookmarks can be used in the conventional sense inasmuch as the bookmarks can store a location in the delivered media related to a position in the delivered media which most recently had been transmitted to the client device 110-1. Notably, the bookmark does not necessarily store the position in the delivered media which had been transmitted most recently to the client device 110-1. Rather, the bookmark also can store a position preceding that position which had been most recently transmitted to the client device 110-1 so that the resumption of delivery of the delivered media at a later time can overlap the delivered media previously transmitted to the client-device 110-1.

While the MODS 100 can retain a subscriber record which can contain a bookmark indicating the subscribers delivered media history, in one embodiment of the present invention, the ISP 300 can retain the subscriber record and the MODS 100 can retain at least a partial copy of the subscriber record. One reason for this system of dual retention is that a user may have several bookmarks of which many may never be used. Notably, the several bookmarks may have been created based upon the delivery of media to a single client device or to a plurality of different client devices having differing formats. As an example, in the architecture shown in FIG. 3, since the ISP 300 provides the delivered media received from the MODS 100 to the client device 110-1, the ISP 300 maintains the subscriber record.

In a further aspect of the invention, copies of the bookmark can be stored both at the ISP 300 and at the MODS 100. In consequence, in the event the copies of the bookmark fall out of synchronization, such as can happen whenever there is a power outage during a software upgrade, then the user of a client device 110-1 can be given the option to select which copy of the bookmark is the correct copy. Once the correct version of the bookmark has been identified, the correct version can be used to overwrite the incorrect version of the bookmark. The process of updating mismatched copies of the same bookmark can be encoded in a Java applet. Specifically, when a request is made to access information in a time code field of the bookmark record stored in the ISP 300, the copy of the bookmark stored in the MODS 100 can be checked to ensure that the time code entries are the same. In the case where the time code entries are not the same, the Java applet can request that the user select the correct bookmark.

Figure 4:
FIG. 4 illustrates the fields in an exemplary bookmark.

FIG. 4 illustrates an exemplary bookmark. Information contained in the exemplary bookmark can be categorized into three major categories—data used to uniquely identify the user 400, data used to uniquely identify the delivered media 405 and data unique to the last presentation of at least a portion of particular delivered media 410, 415, 420, 425, 430, 435, 440. Finally, the bookmark can include a duration field 445 for indicating the last viewed segment or the cumulative time for the completed portions of delivered media. Still, it should be readily understood by one skilled in the art that other information may be included without departing from the spirit of the invention. For example, the bookmark can include user device type and capability information, device type configuration data as well as other security information. If there are a number of bookmarks associated with the delivery of particular delivered media to a particular user, the entries in the table can be duplicated to represent each bookmark.

Notably, the data unique to the last presentation of at least a portion of particular delivered media can include, but is not limited to, a MODS identification 415 which can be used to identify a particular MODS from which delivered media can be transmitted to a client in a particular delivery session, a delivered media identifier 420 for identifying particular delivered media to be delivered from the current MODS, a time code 425 of the last viewed second of the delivered media, a time code 430 of the beginning of the last scene/frame/tract in progress, a last format indicator 430 which can specify the format of delivered media last delivered to a client device, for example, MPEG or WML, and a transaction identifier 440 that can be used as a reference to the current transaction between the MODS or ISP and the client device.

Figure 5:
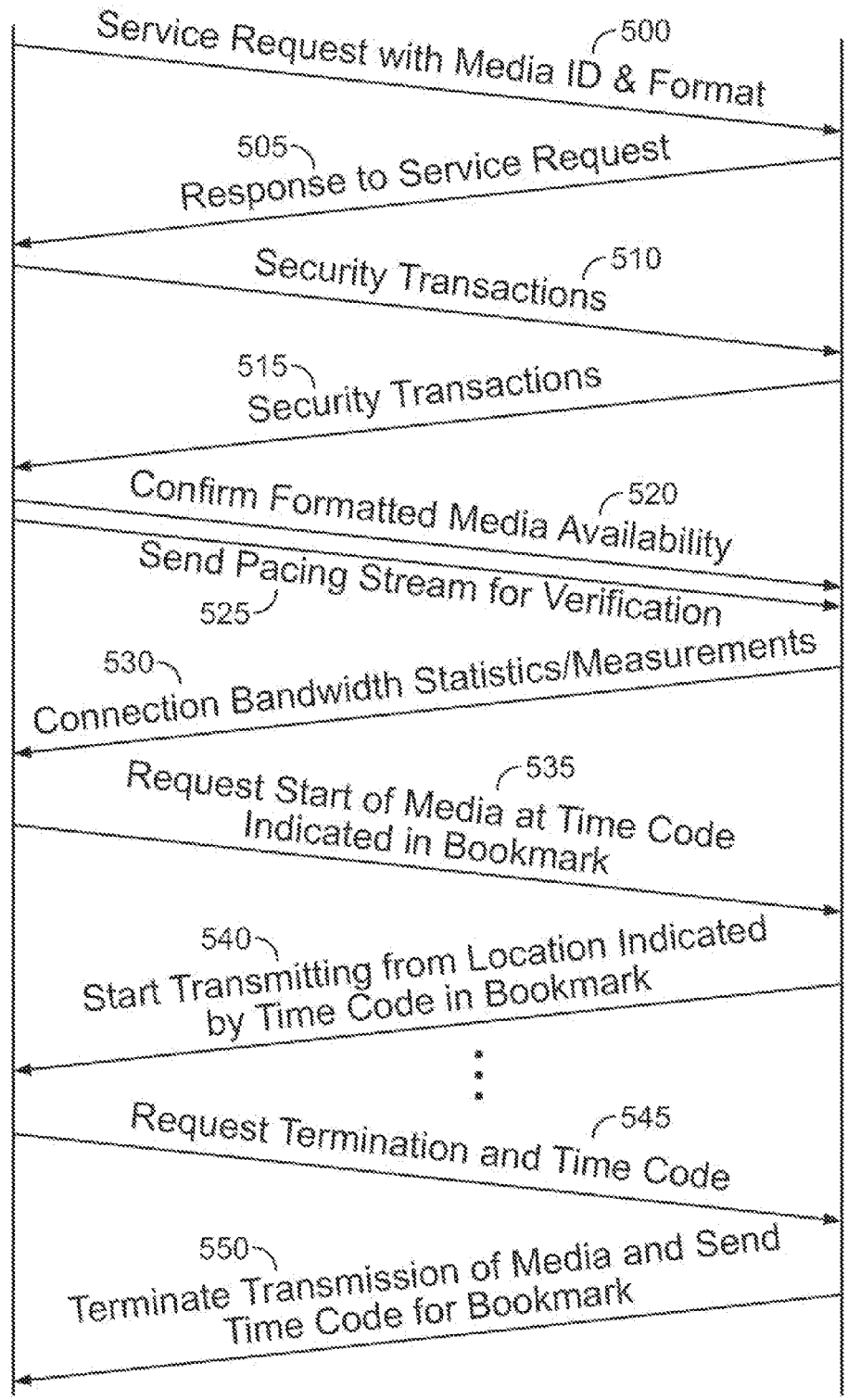
FIG. 5 is an exemplary flow diagram illustrating the messaging that occurs between a MODS and ISP.

FIG. 5 is a communication flow diagram which can illustrate the communication occurring between the MODS 100 and the ISP 300 as shown in FIG. 3. The steps used to determine the client device type and delivered media format are not shown since they are similar to that illustrated in FIG. 2, the only difference being that the determination is performed within an ISP. As shown in FIG. 5, presumably in response to a user request to receive specified delivered media, a MODS 100 can be selected to deliver the specified delivered media.

Once a MODS 100 has been selected, the ISP server 300 can issue a service request 500 to the MODS 100. The service request 500 can contain the delivered media identification and format. Subsequently, the MODS 100 can acknowledge the service request 500 with a response 505. While often it can be preferable to ensure the security of an online transaction, for example the online verification of a user identity and corresponding payment authorization as shown in steps 510 and 515, one skilled in the art will recognize that the security measures illustrated in FIG. 5 are optional.

Following the securing of the communications link in steps 510 and 515, the ISP 300 can confirm the availability of the appropriate format of the delivered media by transmitting an availability message to the MODS 100 in step 520. Additionally, in order to determine the bandwidth requirements, the ISP 300 can send a pacing message 525 to the MODS 100. In response, the MODS 100 can send to the ISP 300 a response 530 having the appropriate statistics/measurements necessary to determine the required bandwidth. Still, as one skilled in the art will recognize, steps 525 and 530 are optional and the absence of steps 525 and 530 or the addition of supplemental steps will not detract from the spirit of the invention. For instance, in an alternative embodiment, steps 525 and 530 can be periodically repeated to evaluate and dynamically adjust the bandwidth settings to ensure acceptable Quality of Service.

The ISP 300 can query a bookmark associated with the requested delivered media and the requesting user. From the queried bookmark, the ISP 300 can identify a position from which to resume (or begin as the case may be) delivery of the requested delivered media. Specifically, in step 535 the ISP 300 can request the MODS 100 to begin transmission of the delivered media at the time code indicated by the specified bookmark. After determining the particular position within the delivered media corresponding to the time code in the bookmark, the MODS 100 can resume (or begin) transmission of the delivered media as shown in step 540.

After some time has elapsed, a terminate request for terminating transmission of the delivered media can be received in the ISP 300, possibly from the client device. In response, a request for termination can be transmitted to the MODS 100 in step 545. In response, in step 550 the MODS 100 can terminate the transmission of the delivered media. Additionally, in a representative embodiment in which the ISP 300 stores the bookmark, the time code can be sent from the MODS 100 to the ISP 300. Moreover, other suitable information necessary for creating a new bookmark and for generating user charges for receiving the delivered media can be sent to the ISP 300.

Figure 6:
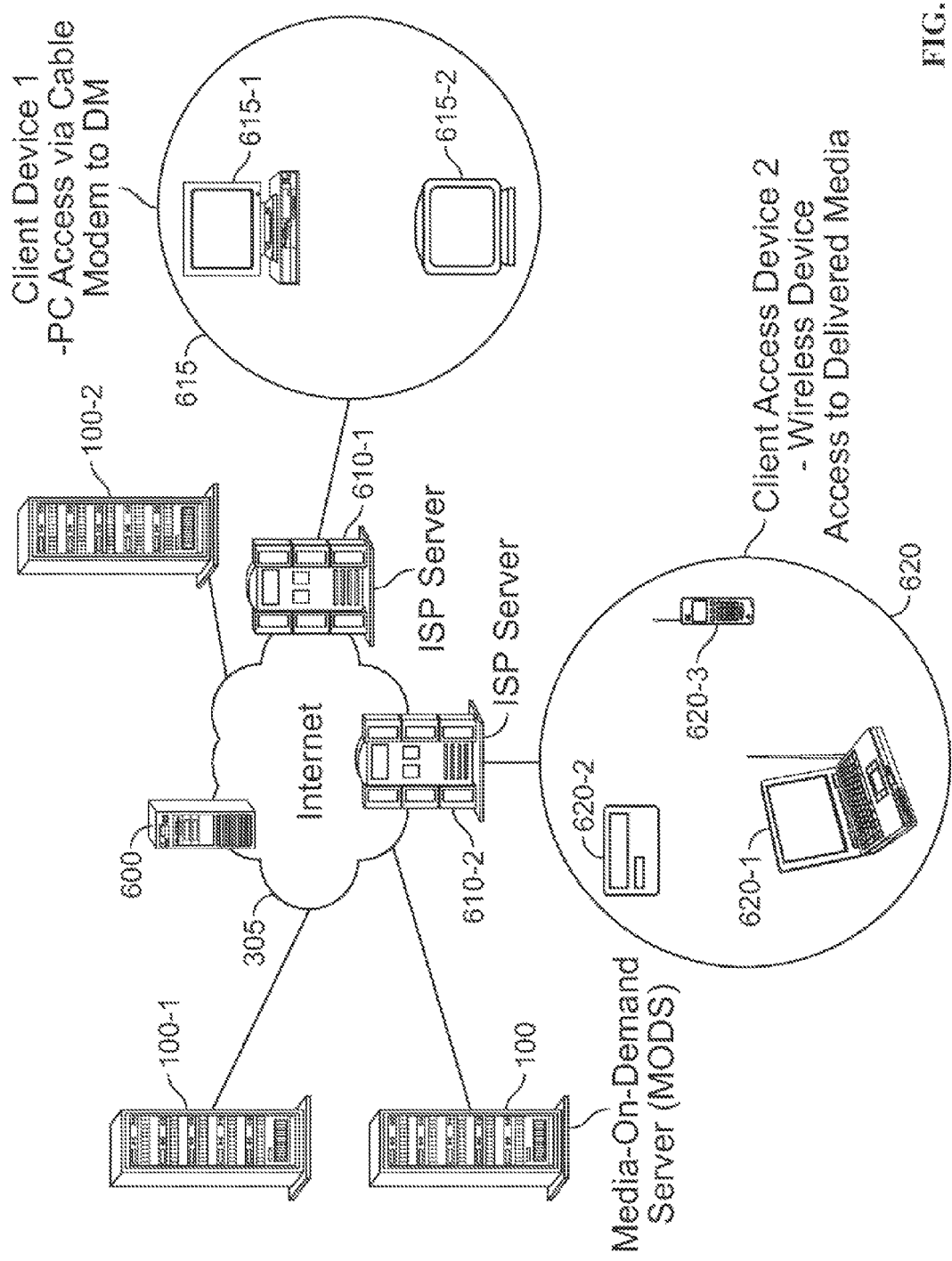
FIG. 6 illustrates is an exemplary network having a plurality of MODS and a plurality of service providers each servicing a different client device type is disclosed.

FIG. 6 illustrates a further embodiment of the invention, in which a plurality of MODS 100 can provide delivered media in various formats to a plurality of ISPs 610. Each format can be selected according to the requirements of various client device types associated with one of a plurality of requesting client devices 615, 620. Referring to FIG. 6, an exemplary network having a plurality of MODS 100 and a plurality of ISPs 610 each servicing a different client device type is disclosed. ISP 610-2 interconnects wireless client devices 620-1, 620-2 and 620-3 to the Internet 305. Similarly, ISP 610-1 interconnects client devices 615-1 and 615-2 to the Internet network 605 via a coaxial cable. In the depicted arrangement, a subscriber can have multiple devices each having its own methodology of accessing the services provided by the MODS 100 through a different ISPs 610. A plurality of MODS 100 such as MODS 100-1, 100-2 and 100-3 can be deployed within the network to more efficiently serve the ISPs 610.

Notably, an Internet Media Aggregator (IMA) 600 can be provided to store bookmarks and to facilitate the conversion of delivered media from a format compatible with one client device type to a format compatible with another client device type. Specifically, delivered media in a format compatible with a first client device type can be retrieved from the MODS 100 by the IMA 600 and dispatched to the first client device without modification. The delivered media in the MODS 100 also can be retrieved by the IMA 600 and dispatched to a second client device. With regard to the second client device however, the IMA 600 can convert the delivered media from a format compatible with the first client device type into a format compatible with the second destination device type.

For example, with reference to FIG. 6, consider the case where a user is at home and has a desire to watch an interactive video presentation on client device 615-2. Client device 615-2 can be used to access the Internet 305 via the ISP server 610-1. The interactive video presentation can be stored in the MODS 100-1 in a global format, for example MPEG-II, recognizable by the client device 615-2. ISP server 610-1 can request IMA 600 to acquire the interactive video presentation from the MODS 100-1. Once the IMA 600 receives the video presentation, it can determine the appropriate format in which to deliver the presentation to the client device 615-2. Based upon the configuration information of client device 615-2, IMA 600 can determine that there is no need to convert the format of the presentation since the client device is capable of accepting an MPEG-II format. Therefore, IMA 600 can deliver the video presentation to the client device 615-2 via ISP server 610-1.

However, due to prior engagements, the user may have to leave home for the airport where he/she is stranded for a few hours. Before leaving home, the user terminates the transmission of the presentation. In consequence, a bookmark of the position in the presentation where the viewing stopped can be recorded in a bookmark stored in the memory of IMA 600. Subsequently, while waiting at the airport, the user can access the network 305 via ISP server 610-2 using client device 620-1. As a result, the ISP server 610-2 can request that the IMA 600 resume the transmission of the interactive video presentation. In particular, the IMA 600 can consult the bookmark and can determine the position in the presentation which had been most recently transmitted to the user's home prior to the user's termination of the transmission.

Once the position has been determined, the IMA 600 also can determine the format compatible with the client device type of the client device 620-1. Specifically, the format can be determined from the configuration information of client device 620-1. Suppose the client device 620-1 can only accept the presentation of delivered media in QuickTime format. As such, IMA 620-1 can convert the MPEG2 format of the delivered media received from the MODS 100-1 into QuickTime format compatible with the client device 620-1. Once the conversion from MPEG2 to QuickTime is complete, IMA 600 can deliver the video presentation to the client device 620-1 via the ISP server 610-2 in a format suitable for receipt by the client device 620-1. Additionally, the IMA 610-2 can request the transmission of the presentation to begin at a point in the presentation defined by the time code field of the bookmark.

In an alternative embodiment, different formats corresponding to each of the supported device types can be stored on one or more of the servers. For example, before doing the conversion from MPEG2 to QuickTime, the IMA 600 could have queried MODS 100-2 to determine if a QuickTime format of the video presentation was already stored in the MODS 100-2. Since MODS 100-2 already had a QuickTime format copy of the presentation, the IMA 600 could have download that copy to the MODS 100-2 rather than having to perform a duplicate conversion of the presentation from MPEG2 to QuickTime.

A further embodiment of the invention can arise in the circumstance of the present example in which the user had forgotten to terminate the session at home because of an urgency to arrive at the airport by a particular time. Once the user accesses the ISP 300 from the airport using client device 620-1, the user can request that the IMA 600 terminate the session in progress with client device 615-1. Subsequently, the user can request that the IMA 600 continue the video presentation session on the client device 620-1.

Notably, since no bookmark previously existed because the user forgot to terminate the session at home, the user can be given the option of estimating a time code that can be proportional to the time of the presentation length. For example, if the video presentation was 2.5 hours (2 hrs:30 mins:00 secs), then entering a time code of 1:30:23 would correspond to a time stamp of 1 hour, 30 minutes and 23 seconds. Hence, if the user wanted to watch the last hour of the video presentation, then the user would enter 01:30:00 as the time code. In order to differentiate this time code from an actual time code, an asterisk (*) could be placed next to the time code to show that it was fictitious.

After the time code has been entered, the IMA 600 can attempt to find a QuickTime format of the video presentation stored on a MODS 100 or convert delivered media in MPEG2 format in MODS 100-1 to QuickTime format. The video presentation then can be streamed from the IMA 600 to the client device 620-1 starting from the entered time code.

A yet further embodiment of the invention can arise in the circumstance of the present example in which the user bookmarked the video presentation before leaving home but intentionally allowed the video presentation to run since someone else at home was watching the video presentation. In this case, when the user arrives at the airport, if the session at home is still in progress, the user can request that the IMA 600 create an additional stream for viewing the presentation on client device 620-1. The user can be charged for additional presentation time and the presentation can begin from the position indicated in the bookmark that the user created before leaving home.

Notably, with regard to the bookmark described herein, it should readily be understood by one skilled in the art that a bookmark does not have to represent the exact point at which the media was discontinued. To compensate for delay or other transitory loss, the bookmark may be placed at a point prior to the actual point of discontinuance of transmission. For example, using a time based bookmark reference, the bookmark may be placed at ten seconds prior to the actual point of discontinuance. Alternately, the bookmark could be placed at the point of discontinuance, and whenever resumption of the media occurs, the resumption is started at a point, for example, 10 seconds prior to the actual point of discontinuance. In addition to using relative time or location based methods for the bookmark, other schemes employing translation of the physical location or time or any combination thereof, may be utilized.

The present invention can be realized in hardware, software, or a combination of hardware and software. Machine readable storage according to the present invention can be realized in a centralized fashion in one computer system, or in a distributed fashion where different elements are spread across several interconnected computer systems. Any kind of computer system or other apparatus adapted for carrying out the methods described herein is acceptable. A typical combination of hardware and software could be a general purpose computer system with a computer program that, when being loaded and executed, controls the computer system such that it carries out the methods described herein. The present invention can also be embedded in a computer program product which comprises all the features enabling the implementation of the methods described herein, and which when loaded in a computer system is able to carry out these methods.

A computer program in the present context can mean any expression, in any language, code or notation, of a set of instructions intended to cause a system having an information processing capability to perform a particular function either directly or after either or both of the following: (a) conversion to another language, code or notation; and (b) reproduction in a different material form. The invention disclosed herein can be a method embedded in a computer program which can be implemented by a programmer using commercially available development tools.

The invention claimed is:

1. A method of delivering media, comprising:
   delivering media to a first device;
   receiving, from the first device, a first request to pause the media at a first point in the media;
   storing a bookmark for the media in response to the pause request, wherein the bookmark indicates a second point in the media that precedes the first point and is after a starting point of the media, and wherein the bookmark does not indicate the first point;
   receiving, from a second device different from the first device, a second request to resume the media;
   responsive to receiving the second request, accessing the bookmark to identify the second point; and
   delivering the media to the second device beginning from the second point identified from the bookmark.

2. The method of claim 1, wherein the bookmarked position precedes the first point by a set time offset.

3. The method of claim 1, further comprising querying the bookmark in response to receiving the request to access the media from the second device.

4. The method of claim 3, further comprising receiving a an identification of the second point in response to the querying.

5. The method of claim 4, wherein the received bookmarked time precedes the first point by an offset.

6. A system for delivering media, comprising:
   a server configured to:
      deliver media to a first device;
      receive, from the first device, a first request to pause the media at a first point in the media;
      store a bookmark for the media in response to the pause request, wherein the bookmark indicates a second point in the media that precedes the first point and is after a starting point of the media, and wherein the bookmark does not indicate the first point;

receive, from a second device different from the first device, a second request to resume the media;

responsive to receiving the second request, access the bookmark to identify the second point; and deliver the media to the second device beginning from the second point identified from the bookmark.

7. The system of claim 6, wherein the bookmarked position precedes the first point by a set time offset.

8. The system of claim 6, wherein the server is further configured to query the bookmark in response to receiving the request to access the media from the second device.

9. The system of claim 8, wherein the server is further configured to receive an identification of the second point in response to the query.

10. The system of claim 9, wherein the received bookmarked time precedes the first point by an offset.

\* \* \* \* \*